(12) United States Patent
Kato

(10) Patent No.: US 7,927,671 B2
(45) Date of Patent: Apr. 19, 2011

(54) TRIFUNCTIONAL COMPOUND, COMPOSITION AND POLYMER THEREOF

(75) Inventor: Takashi Kato, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 658 days.

(21) Appl. No.: 11/902,476

(22) Filed: Sep. 21, 2007

(65) Prior Publication Data
US 2008/0081133 A1    Apr. 3, 2008

(30) Foreign Application Priority Data

Sep. 21, 2006    (JP) .................. 2006-255929

(51) Int. Cl.
*C09K 19/20*    (2006.01)
*C09K 19/38*    (2006.01)
*C09K 19/54*    (2006.01)
*C07C 69/76*    (2006.01)

(52) U.S. Cl. ............... 428/1.1; 252/299.5; 252/299.67; 560/85; 560/95

(58) Field of Classification Search .................. 560/76, 560/85, 95; 428/1.1; 252/299.5, 299.67
See application file for complete search history.

(56) References Cited

U.S. PATENT DOCUMENTS

| | | | |
|---|---|---|---|
| 5,593,617 A | 1/1997 | Kelly et al. | 252/299.67 |
| 5,650,534 A | 7/1997 | Kelly et al. | 560/66 |
| 5,863,457 A | 1/1999 | Hasebe et al. | 252/299.01 |

FOREIGN PATENT DOCUMENTS

| | | |
|---|---|---|
| JP | 07-017910 | 1/1995 |
| JP | 09-316032 | 12/1997 |
| WO | WO 99-37735 | 7/1999 |
| WO | WO 00-48985 | 8/2000 |
| WO | WO 00-59966 | 10/2000 |
| WO | WO 00-63154 | 10/2000 |
| WO | WO 02-090447 A1 | 11/2002 |
| WO | WO 2005-054406 A1 | 6/2005 |

OTHER PUBLICATIONS

Felix Kleinschmidt et al., "Lamellar Liquid Single Crystal Hydrogels: Synthesis and Investigation of Anisotropic Water Diffusion and Swelling," Macromolecules, vol. 38, No. 23, pp. 9772-9782 (Nov. 15, 2005).

*Primary Examiner* — Shean C Wu
(74) *Attorney, Agent, or Firm* — Hogan Lovells US LLP

(57) ABSTRACT

The invention includes compounds represented by Formula (1):

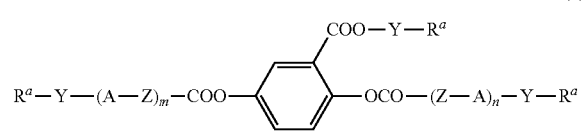

wherein $R^a$ is a polymerizable group such as (meth)acryloyloxy, an oxirane ring, an oxetane ring or the like; A is 1,4-cyclohexylene, 1,4-phenylene or the like; Z is a single bond, alkylene having 1 to 20 carbon atoms or the like; Y is a single bond, alkylene having 1 to 20 carbon atoms or the like; and m and n are an integer of 0 to 5.

44 Claims, No Drawings

TRIFUNCTIONAL COMPOUND, COMPOSITION AND POLYMER THEREOF

CROSS REFERENCE TO RELATED APPLICATIONS

This application claims priority under 35 U.S.C. §119 to Japanese Patent Application No. JP 2006-255929, filed Sep. 21, 2006, which application is expressly incorporated herein by reference in its entirety.

BACKGROUND OF THE INVENTION

1. Field of the Invention

The invention relates to a compound having two polymerizable groups at an end of a molecular long axis and one polymerizable group at an end of a molecular short axis, a composition including the above compound, a polymer prepared from the above compound and applications thereof.

2. Description of the Related Art

A polymer in which molecular arrangement is fixed is obtained by orienting molecules of a polymerizable compound having a liquid crystallinity to a fixed direction and photopolymerizing it. It is known that such polymer has an optical anisotropy (see JP H8-3111 A/1996 (equivalent to U.S. Pat. No. 5,863,457)). The polymerizable compound having a liquid crystallinity includes, for example, acrylates shown below (see P H7-17910A/1995 and JP H9-316032 A/1997).

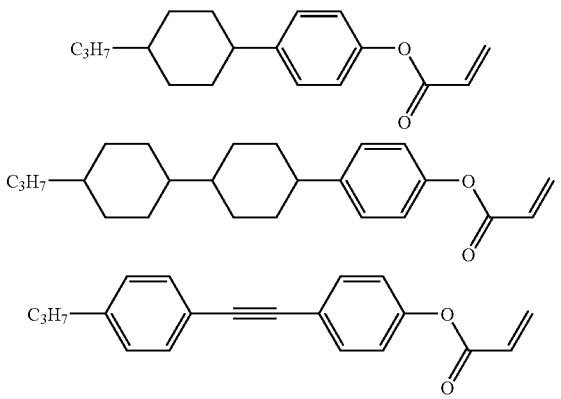

The above acrylates have a high reactivity, and polymers obtained therefrom have a high transparency. However, the polymerization mode is radical polymerization reaction, and therefore it is required to carry out the reaction in nitrogen and increase the amount of energy irradiated with a UV ray. Accordingly, required is an improvement in the workability by curing in the air and an improvement in its heat resistance, shrinkage, adhesive property, close adhesiveness, mechanical strength and the like.

SUMMARY OF THE INVENTION

The invention relates to a compound represented by Formula (1):

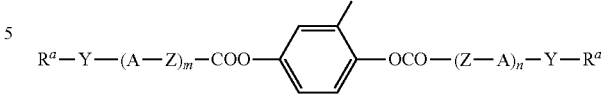

wherein in Formula (1), $R^a$ is independently any of the groups represented by Formulas (2-1) to (2-6);

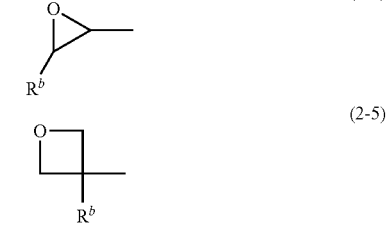

A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —$CH_2$— may be replaced by —O—, optional —CH= may be replaced by —N= and optional hydrogens may be replaced by halogen, alkyl having 1 to 5 carbon atoms or halogenated alkyl having 1 to 5 carbon atoms; Z is independently a single bond or alkylene having 1 to 20 carbon atoms; in the alkylene, optional —$CH_2$— may be replaced by —O—, —CO—, —COO—, —OCO—, —CH=CH—, —CF=CF— or —C≡C— and optional hydrogen may be replaced by halogen; Y is independently a single bond or alkylene having 1 to 20 carbon atoms; in the alkylene, optional —$CH_2$— may be replaced by —O—, —CO—, —COO—, —OCO—, —OCOO— or —CH=CH— and optional hydrogen may be replaced by halogen; m and n are independently an integer of 0 to 5; when all $R^a$ are methacryloyloxy groups, excluded is the case in which m=n=1, two A are 1,4-phenylene, two Z are single bonds, two Y adjacent to A are —$(OCH_2)_4$— and remaining Y is —CH$_2$CH$_2$—; wherein in Formulas (2-1) to (2-6), R$^b$ is independently hydrogen, halogen or alkyl having 1 to 5 carbon atoms, and optional hydrogen in the alkyl may be replaced by halogen.

DETAILED DESCRIPTION OF THE INVENTION

The embodiments of the invention for achieving the objects described above are described in the following items. In the following items, the preferred examples of end groups, rings and bonding groups in a compound (1) are described as well.

The invention includes:

[1] A compound represented by Formula (1):

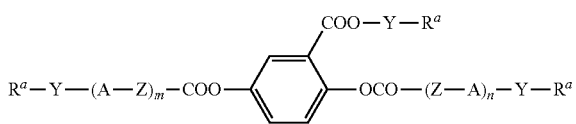

(1)

In Formula (1), R$^a$ is independently any of groups represented by Formulas (2-1) to (2-6);

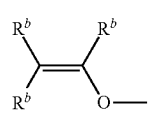

(2-1)

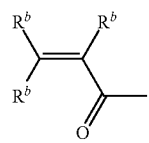

(2-2)

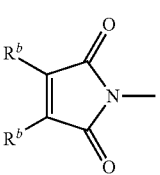

(2-3)

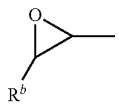

(2-4)

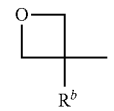

(2-5)

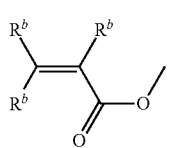

(2-6)

A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —CH$_2$— may be replaced by —O—, optional —CH= may be replaced by —N= and optional hydrogens may be replaced by halogen, alkyl having 1 to 5 carbon atoms or halogenated alkyl having 1 to 5 carbon atoms; Z is independently a single bond or alkylene having 1 to 20 carbon atoms; in the alkylene, optional —CH$_2$— may be replaced by —O—, —CO—, —COO—, —OCO—, —CH=CH—, —CF=CF— or —C≡C— and optional hydrogen may be replaced by halogen; Y is independently a single bond or alkylene having 1 to 20 carbon atoms; in the alkylene, optional —CH$_2$— may be replaced by —O—, —CO—, —COO—, —OCO—, —OCOO— or —CH=CH— and optional hydrogen may be replaced by halogen; m and n are independently an integer of 0 to 5.

When all R$^a$ are methacryloyloxy groups, excluded is the case in which m=n=1, two A are 1,4-phenylene, two Z are single bonds, two Y adjacent to A are —(OCH$_2$)$_4$— and remaining Y is —CH$_2$CH$_2$—.

In Formulas (2-1) to (2-6), R$^b$ is independently hydrogen, halogen or alkyl having 1 to 5 carbon atoms, and optional hydrogen in the alkyl may be replaced by halogen.

In this respect, the meaning of a phrase "in alkyl, optional —CH$_2$— may be replaced by —O—, —CH=CH— and the like" shall be shown by one example. Groups in which optional —CH$_2$— in C$_4$H$_9$— is replaced by —O— or —CH=CH— are C$_3$H$_7$O—, CH$_3$—O—(CH$_2$)$_2$—, CH$_3$—O—CH$_2$—O—, H$_2$C=CH—(CH$_2$)$_3$—, CH$_3$—CH=CH—(CH$_2$)$_2$—, CH$_3$—CH=CH—CH$_2$—O— and the like. As shown above, the word of "optional" means "at least one selected without distinction."

Preferred R$^a$ are vinyl ketone, vinyl ether, maleimide, oxirane, methyloxetane, ethyloxetane, acryloyloxy and methacryloyloxy. Particularly preferred R$^a$ are oxirane, methyloxetane, ethyloxetane, acryloyloxy and methacryloyloxy.

Preferred R$^b$ are hydrogen and alkyl having 1 to 3 carbon atoms. More preferred R$^b$ are hydrogen, methyl and ethyl. Particularly preferred R$^b$ is hydrogen.

Preferred A are 1,4-cyclohexylene, 1,4-cyclohexenylene, 2,2-difluoro-1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 3-fluoropyridine-2,5-diyl, pyrimidine-2,5-diyl, pyridazine-3,6-diyl, naphthalene-2,6-diyl, tetrahydronaphthalene-2,6-diyl, fluorene-2,7-diyl, 9-methylfluorene-2,7-diyl, 9,9-dimethylfluorene-2,7-diyl, 9-ethylfluorene-2,7-diyl, 9-fluorofluorene-2,7-diyl, 9,9-difluorofluorene-2,7-diyl and the like.

The steric configuration of 1,4-cyclohexylene and 1,3-dioxane-2,5-diyl is preferably trans rather than cis. 2-Fluoro-1,4-phenylene is structurally identical to 3-fluoro-1,4-phenylene, and therefore the latter is not shown as the example. This rule shall be applied to the relationship between 2,5-difluoro-1,4-phenylene and 3,6-difluoro-1,4-phenylene. When m is an integer of 2 to 10, two A optionally selected may be the same or different.

More preferred A are 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene and 2,6-difluoro-1,4-phenylene. Particularly preferred A are 1,4-cyclohexylene and 1,4-phenylene.

Preferred Z are a single bond, —(CH$_2$)$_2$—, —(CF$_2$)$_2$—, —CH$_2$O—, —OCH$_2$—, —CF$_2$O—, —OCF$_2$—, —COO—, —OCO—, —CH=CH—, —CF=CF—, —C≡C—, —(CH$_2$)$_4$—, —(CH$_2$)$_3$O—, —O(CH$_2$)$_3$—, —(CH$_2$)$_2$COO—, —OCO(CH$_2$)$_2$—, —CH=CH—COO— and —OCO—CH=CH—.

More preferred Z are a single bond, —(CH$_2$)$_2$—, —COO—, —OCO—, —CH$_2$O—, —OCH$_2$—, —CF$_2$O—, —OCF$_2$—, —CH=CH—, —C≡C—, —(CH$_2$)$_2$COO—, —OCO(CH$_2$)$_2$—, —CH═CH—COO— and —OCO—CH═CH—. Particularly preferred Z are a single bond, —COO—, —OCO—, —CH═CH—, —(CH$_2$)$_2$COO—, —OCO(CH$_2$)$_2$—, —CH═CH—COO— and —OCO—CH═CH—. When m is an integer of 2 to 10, two Z optionally selected may be the same or different.

Preferred Y is a single bond and alkylene having 1 to 10 carbon atoms, and in the alkylene, optional —CH$_2$— may be replaced by —O—, —COO—, —OCO— or —OCOO—.

[2] The compound as described in item [1], wherein in Formula (1), m+n is an integer of 1, 2, or 3.

[3] The compound as described in item [1], wherein in Formula (1), m+n is 2.

[4] The compound as described in any of items [1] to [3], wherein in Formula (1), R$^a$ is independently a group represented by Formula (2-4), (2-5) or (2-6).

[5] The compound as described in any of items [1] to [4], wherein in Formula (1), A is independently 1,4-cyclohexylene, 1,4-phenylene, pyridine-2,5-diyl, pyridazine-3,6-diyl or pyrimidine-2,5-diyl, and optional hydrogens in these rings may be replaced by Cl, F, alkyl having 1 to 3 carbon atoms or fluoroalkyl having 1 to 3 carbon atoms.

[6] The compound as described in any of items [1] to [5], wherein in Formula (1), Z is independently a single bond, —CH$_2$O—, —OCH$_2$—, —COO—, —OCO—, —CH═CH—, —(CH$_2$)$_2$COO—, —OCO(CH$_2$)$_2$—, —CH═CH—COO—, —OCO—CH═CH— or —C≡C—.

[7] The compound as described in any of items [1] to [6], wherein in Formula (1), Y is independently alkylene having 1 to 10 carbon atoms, and optional —CH$_2$— in the alkylene may be replaced by —O—, —COO—, —OCO— or —OCOO—.

[8] A compound represented by Formula (I) or (II):

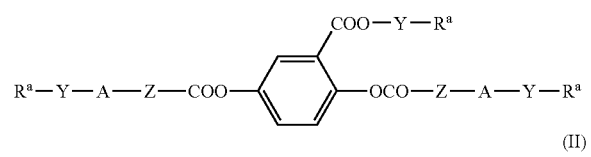

(I)

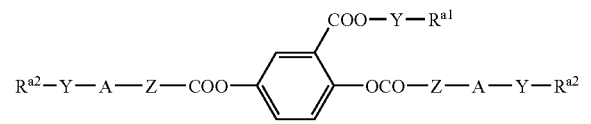

(II)

In Formulas (I) and (II), R$^a$, R$^{a1}$ and R$^{a2}$ are independently any of the groups represented by Formulas (2-1) to (2-6), and R$^{a1}$ is not the same as R$^{a2}$; A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —CH$_2$— may be replaced by —O—, optional —CH═ may be replaced by —N═ and optional hydrogens may be replaced by halogen, alkyl having 1 to 5 carbon atoms or halogenated alkyl having 1 to 5 carbon atoms; Z is independently a single bond or alkylene having 1 to 20 carbon atoms; in the alkylene, optional —CH$_2$— may be replaced by —O—, —CO—, —COO—, —OCO—, —CH═CH—, —CF═CF— or —C≡C— and optional hydrogen may be replaced by halogen; Y is independently a single bond or alkylene having 1 to 20 carbon atoms; in the alkylene, optional —CH$_2$— may be replaced by —O—, —CO—, —COO—, —OCO—, —OCOO— or —CH═CH—; and optional hydrogen may be replaced by halogen.

When all R$^a$ in Formula (1) are methacryloyloxy groups, excluded is the case in which two A are 1,4-phenylene, two Z are single bonds, two Y adjacent to A are —(OCH$_2$)$_4$— and remaining Y is —CH$_2$CH$_2$—.

[9] The compound as described in item [8], wherein in Formulas (I) and (II), R$^a$, R$^{a1}$ and R$^{a2}$ are each independently a group represented by Formula (2-4), (2-5) or (2-6).

[10] The compound as described in items [8] or [9], wherein in Formulas (I) and (II), A is independently 1,4-cyclohexylene, 1,4-phenylene, pyridine-2,5-diyl, pyridazine-3,6-diyl or pyrimidine-2,5-diyl, and optional hydrogens in these rings may be replaced by Cl, F, alkyl having 1 to 3 carbon atoms or fluoroalkyl having 1 to 3 carbon atoms.

[11] The compound as described in any of items [8] to [10], wherein in Formulas (I) and (II), Z is independently a single bond, —CH$_2$O—, —OCH$_2$—, —COO—, —OCO—, —CH═CH—, —(CH$_2$)$_2$COO—, —OCO(CH$_2$)$_2$—, —CH═CH—COO—, —OCO—CH═CH— or —C≡C—.

[12] The compound as described in any of items [8] to [11], wherein in Formulas (I) and (II), Y is independently a single bond or alkylene having 1 to 10 carbon atoms, and optional —CH$_2$— in the alkylene may be replaced by —O—, —COO—, —OCO— or —OCOO—.

[13] The compound as described in any of items [8] to [12], wherein in Formulas (I) and (II), A is independently 1,4-cyclohexylene or 1,4-phenylene, and optional hydrogens in these rings may be replaced by Cl, F, CH$_3$ or CF$_3$.

[14] The compound as described in any of items [8] to [13], wherein in Formulas (I) and (II), Z is independently a single bond, —COO— or —OCO—.

[15] The compound as described in any of items [8] to [14], wherein in Formulas (I) and (II), Y is independently alkylene having 1 to 10 carbon atoms, and —CH$_2$— adjacent to the ring in the alkylene may be replaced by —O—, —COO—, —OCO— or —OCOO—.

[16] A composition including at least one compound as described in any of items [1] to [15].

[17] A composition including at least compound represented by Formula (1) as described in item [1] and at least compound selected from the group of compounds represented by Formulas (M1), (M2) and (M3).

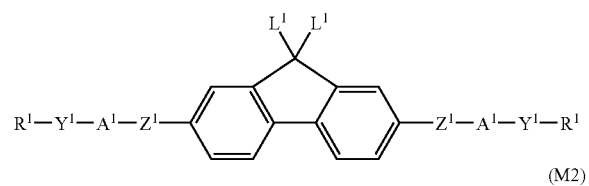

(M1)

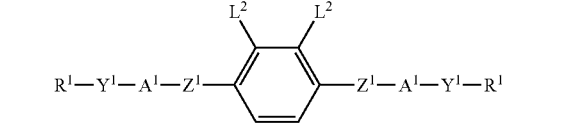

(M2)

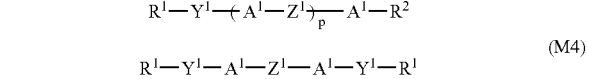

(M3)

(M4)

In Formulas (M1), (M2), (M3) and (M4), R$^1$ is independently a group represented by Formula (2-4), (2-5) or (2-6) described in item [1]; R$^2$ is alkyl having 1 to 10 carbon atoms, alkoxy having 1 to 10 carbon atoms, Cl, F, CN, $CF_3$ or $OCF_3$; $A^1$ is independently 1,4-cyclohexylene or 1,4-phenylene, and optional hydrogen in the 1,4-phenylene may be replaced by F; $Z^1$ is independently a single bond, —$CH_2CH_2$—, —$CH_2O$—, —$OCH_2$—, —COO—, —OCO—, —CH=CH—, —C≡C—, —CH=CH—COO—, —CH=CH—OCO—, —$(CH_2)_2$COO— or —$(CH_2)_2$OCO—; $Y^1$ is independently a single bond or alkylene having 1 to 20 carbon atoms, and in the alkylene, optional —$CH_2$— may be replaced by —O—, —CO—, —COO—, —OCO—, —OCOO— or —CH=CH—; $L^1$ is independently H, F or $CH_3$; $L^2$ is independently H, Cl, F, $CH_3$ or $CF_3$; and p is an integer of 1 or 2.

[18] The composition as described in item [17], wherein in Formula (1), $R^a$ is independently a group represented by (2-4), (2-5) or (2-6); A is independently 1,4-cyclohexylene, 1,4-phenylene, pyridine-2,5-diyl, pyridazine-3,6-diyl or pyrimidine-2,5-diyl, and optional hydrogens in these rings may be replaced by Cl, F, alkyl having 1 to 3 carbon atoms or fluoroalkyl having 1 to 3 carbon atoms; Z is independently a single bond, —$CH_2O$—, —$OCH_2$—, —COO—, —OCO—, —CH=CH—, —$(CH_2)_2$COO—, —OCO$(CH_2)_2$—, —CH=CH—COO—, —OCO—CH=CH— or —C≡C—; Y is independently a single bond or alkylene having 1 to 10 carbon atoms, and optional —$CH_2$— in the alkylene may be replaced by —O—, —COO—, —OCO— or —OCOO—; m=n=1; in Formulas (M1), (M2), (M3) and (M4), $R^1$ is independently a group represented by Formula (2-4), (2-5) or (2-6); $R^2$ is alkyl having 1 to 5 carbon atoms, alkoxy having 1 to 5 carbon atoms, Cl, F; CN, $CF_3$ or $OCF_3$; $A^1$ is independently 1,4-cyclohexylene, 1,4-phenylene, monofluoro-1,4-phenylene or difluoro-1,4-phenylene; $Z^1$ is independently a single bond, —$CH_2O$—, —$OCH_2$—, —COO—, —OCO—, —C≡C—, —CH=CHCOO—, —CH=CHOCO—, —$(CH_2)_2$COO— or —$(CH_2)_2$OCO—; $Y^1$ is independently a single bond or alkylene having 1 to 10 carbon atoms, and in the alkylene, optional —$CH_2$— may be replaced by —O—, —COO—, —OCO— or —OCOO—; $L^1$ is independently H, F or $CH_3$; $L^2$ is independently H, Cl, F, $CH_3$ or $CF_3$; p is an integer of 1 or 2; a proportion of the compound represented by Formula (1) is approximately 5% to approximately 80% by weight, and a proportion of the compounds represented by Formulas (M1), (M2), (M3) and (M4) is approximately 20 to approximately 95% by weight each based on the total amount of the compound represented by Formula (1) and the compounds represented by Formulas (M1), (M2), (M3) and (M4).

[19] The composition as described in item [17], wherein in Formula (1), $R^a$ is independently a group represented by Formula (2-4), (2-5) or (2-6); A is independently 1,4-cyclohexylene or 1,4-phenylene, and optional hydrogens in these rings may be replaced by Cl, F, $CH_3$ or $CF_3$; Z is independently a single bond, —COO— or —OCO—; Y is independently alkylene having 1 to 10 carbon atoms, and in the alkylene, —$CH_2$— adjacent to the ring may be replaced by —O—, —COO—, —OCO— or —OCOO—; m=n=1; in Formulas (M1), (M2), (M3) and (M4), $R^1$ is independently a group represented by Formula (2-4), (2-5) or (2-6); $R^2$ is alkyl having 1 to 5 carbon atoms, alkoxy having 1 to 5 carbon atoms, CN, F or $OCF_3$; $A^1$ is independently 1,4-cyclohexylene, 1,4-phenylene, monofluoro-1,4-phenylene or difluoro-1,4-phenylene; $Z^1$ is independently a single bond, —COO—, —OCO—, —CH=CHCOO—, —CH=CHOCO—, —$(CH_2)_2$COO— or —$(CH_2)_2$OCO—; $Y^1$ is independently a single bond or alkylene having 1 to 10 carbon atoms, and in the alkylene, —$CH_2$— adjacent to the ring may be replaced by —O—, —COO—, —OCO— or —OCOO—; $L^1$ is independently H or $CH_3$; $L^2$ is independently H, F, $CH_3$ or $CF_3$; p is 2; a proportion of the compound represented by Formula (1) is approximately 5% to approximately 60% by weight, and a proportion of the compounds represented by Formulas (M1), (M2), (M3) and (M4) is approximately 40% to approximately 95% by weight each based on the total amount of the compound represented by Formula (1) and the compounds represented by Formulas (M1), (M2), (M3) and (M4).

[20] The composition as described in any of items [16] to [19], further including other polymerizable compounds.

[21] The composition as described in any of items [16] to [20], further including other polymerizable optically active compounds.

[22] The composition as described in any of items [16] to [21], further including a non-polymerizable liquid crystalline compound.

[23] The composition as described in any of items [16] to [22], further including a non-polymerizable optically active compound.

[24] A polymer including a constitutional unit derived from the compound as described in any of items [1] to [15].

[25] A polymer obtained by polymerizing the composition as described in any of items [16] to [23].

[26] The polymer as described in item [24] or [25], wherein the polymer is an optically active compound.

[27] A film including the polymer as described in any of items [24] to [26].

[28] A molded article having an optical anisotropy, including the polymer as described in any of items [24] to [26].

[29] A liquid crystal display element including the film as described in item [27] or the molded article having an optical anisotropy as described in item [28].

[30] A liquid crystal display element including the composition as described in any of items [16] to [23].

The compound of the invention has three polymerizable groups and is provided with properties such as a broad temperature range of a liquid crystal phase at room temperature as the center, a good miscibility and the like, and the composition including the compound of the invention has a good coating property and the like. The polymer obtained by polymerizing the composition of the invention exhibits excellent optical anisotropy, transparency, chemical stability, heat resistance, hardness, dimensional stability, adhesive property, close adhesiveness, mechanical strength and the like, and it has the characteristic that an optical elasticity, water permeability, water-absorbing property and gas permeability are low. Accordingly, the polymer of the invention is suited for use as a retardation film, a polarizing element, a circularly polarized light element, an elliptically polarized light element, an anti-reflection film, a selective reflection film, a color compensator, a viewing angle compensator, a liquid crystal alignment film and the like. The mechanical strength described above means a Young's modulus, a tensile strength, a tear strength, a flexural strength, a flexural modulus, an impact strength and the like.

The compound having three polymerizable groups according to the invention, the composition including the compound, the polymer obtained from the composition and applications thereof shall be explained below in detail.

The terms in the specification are used as follows: a "liquid crystalline compound" is a general term for a compound having a liquid crystal phase such as a nematic phase, a smectic phase and the like and a compound which does not have a liquid crystal phase but is useful as a component for a liquid crystal composition. A "compound (1)" means a compound represented by Formula (1). Further, it means at least one of compounds represented by Formula (1) in a certain case. A "composition (1)" means a composition including at least one compound selected from the compounds (1). A "polymer (1)" means a polymer obtained by polymerizing the compound (1) or the composition (1). "(Meth)acryloyloxy" means acryloyloxy or methacryloyloxy, and "(meth)acrylic acid" means acrylic acid or methacrylic acid.

Further, in the chemical formulas, when one compound has plural A, optional two A may be the same or different. This rule is applied to symbols such as Y, Z and the like. The meaning of a phrase "in alkyl, optional —CH$_2$— may be replaced by —O—, —CH=CH— and the like" shall be shown by one example. Groups in which optional —CH$_2$— in C$_4$H$_9$— is replaced by —O— or —CH=CH— are, for example, C$_3$H$_7$O—, CH$_3$—O—(CH$_2$)$_2$—, CH$_3$—O—CH$_2$—O—, H$_2$C=CH—(CH$_2$)$_3$—, CH$_3$—CH=CH—(CH$_2$)$_2$—, CH$_3$—CH=CH—CH$_2$—O— and the like. As shown above, the word of "optional" means "at least one selected without distinction." Considering the stability of the compounds, CH$_3$—O—CH$_2$—O— in which oxygen is not adjacent to oxygen is preferred rather than CH$_3$—O—O—CH$_2$— in which oxygen is adjacent to oxygen.

Compound

The compound (1) of the invention has, as shown in Formula (1), three polymerizable functional groups and therefore shows characteristics such as a high polymerization reactivity, a good developing property of a liquid crystal phase, a broad temperature range of a liquid crystal phase, an appropriate optical anisotropy, a good miscibility and the like. The compounds (I) and (II) of the invention are one of the preferred embodiments of the compound (1).

When the compound (1) is mixed with other liquid crystalline compounds and polymerizable compounds, the mixture is liable to be readily homogeneous. The compound (1) is characterized by that a part thereof has a liquid crystallinity. Further, the compound (1) has an optical activity when it has asymmetric carbon.

Suitable selection of an end group, a ring and a bonding group of the compound (1) makes it possible to optionally control the characteristics such as an optical anisotropy and the like. Effects given to the physical properties of the compound (1) by the kinds of the end group R$^a$, the ring A and the bonding group Z shall be explained below.

When the ring A is 1,4-phenylene, 1,4-phenylene in which optional hydrogen is replaced by fluorine, pyridine-2,5-diyl, pyrimidine-2,5-diyl or pyridazine-3,6-diyl, the compound (1) has a large optical anisotropy. When the ring A is 1,4-cyclohexylene, 1,4-cyclohexenylene or 1,3-dioxane-2,5-diyl, the compound (1) has a small optical anisotropy. When at least two rings out of the plural rings A are 1,4-cyclohexylene, the compound (1) has a high clearing point, a small optical anisotropy and a low viscosity. When at least one ring thereof is 1,4-phenylene, the compound (1) has a relatively large optical anisotropy and a large orientational order parameter. When at least two rings thereof are 1,4-phenylene, the compound (1) has a large optical anisotropy, a broad temperature range of a liquid crystal phase and a high clearing point.

When the bonding group Z is a single bond, —(CH$_2$)$_2$—, —CH$_2$O—, —OCH$_2$—, —CF$_2$O—, —OCF$_2$—, —CH=CH—, —CF=CF— or —(CH$_2$)$_4$—, the compound (1) has a low viscosity. When the bonding group Z is a single bond, —(CH$_2$)$_2$—, —OCF$_2$—, —CF$_2$O—, —CH=CH— or —(CH$_2$)$_4$—, the compound (1) has a lower viscosity. When the bonding group Z is —CH=CH— or —CF=CF—, the compound (1) has a broad temperature range of a liquid crystal phase and a large elastic constant ratio. When the bonding group Z is —C≡C—, the compound (1) has a large optical anisotropy.

When the compound (1) has three or less rings, it has a low viscosity, and when the compound (1) has three or more rings, it has a high clearing point. In this regard, a six-membered ring and the like are regarded as a ring, and a cyclic polymerizable group is not regarded as a ring.

The compound (1) may be optically active or optically inactive. When the compound (1) is optically active, it has asymmetric carbon. A steric configuration of the asymmetric carbon may be either R or S. When the compound (1) has asymmetric carbon, it has a good compatibility.

As described above, suitable selection of the kinds of the end group, the ring and the bonding group and the number of the ring makes it possible to obtain the compound having physical properties which meet the objects.

The compound (1) can be synthesized by combining organic synthetic chemical methods. A method for introducing an end group, a ring and a bonding group which meet the objects into the starting material is described in documents such as Houben-Wyle, METHODS OF ORGANIC CHEMISTRY, (Georg Thieme Verlag, Stuttgart), Organic Syntheses (John Wily & Sons, Inc.), ORGANIC REACTIONS (John Wily & Sons Inc.), COMPREHENSIVE ORGANIC SYNTHESIS (Pergamon Press), NEW EXPERIMENTAL CHEMICAL COURSE (Maruzen) and the like.

Synthesis of the bonding group Z shall be explained in Schemes 1 to 12. In these schemes, MSG$^1$ and MSG$^2$ are monovalent organic groups having at least one ring. Plural MSG$^1$ (or plural MSG$^2$) may be the same or different. Compounds (1A) to (1M) correspond to the compound (1) of the invention. These methods can be applied to the optically active compound (1) and the optically inactive compound (1). Further, these methods can be applied as well when the parts such as Y and the like are synthesized.

Scheme 1: Compound in which Z is a Single Bond

As shown below, arylboric acid (S1) is reacted with a compound (S2) synthesized by a publicly known method in a carbonate aqueous solution in the presence of a catalyst such as tetrakis(triphenylphosphine)palladium, whereby a compound (1A) can be synthesized. This compound (1A) can be synthesized as well by reacting a compound (S3) synthesized by a publicly known method with n-butyllithium and then with zinc chloride, followed by further reacting with the compound (S2) in the presence of a catalyst such as dichlorobis(triphenylphosphine)-palladium.

Scheme 2: Compound in which Z is —CH=CH—

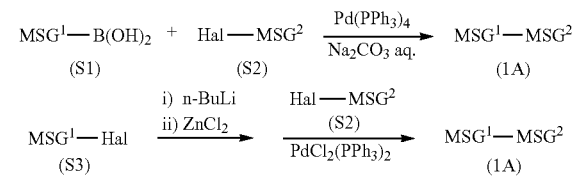

As shown below, phosphorus ylide produced by adding a base such as potassium t-butoxide to a phosphonium salt (S5) synthesized by a publicly known method is reacted with aldehyde (S4), whereby a compound (1B) can be synthesized. The cis body is produced depending on the reaction conditions and the base material, and therefore the cis body is isomerized, if necessary, to the trans body by a publicly known method.

Scheme 3: Compound in which Z is ——(CH$_2$)$_2$——

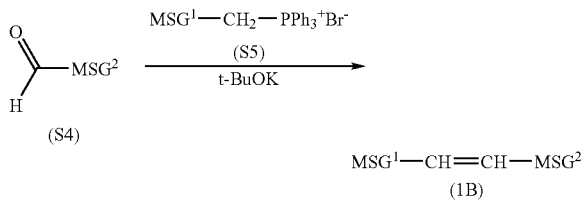

As shown below, the compound (1B) is hydrogenated in the presence of a catalyst such as palladium carbon, whereby a compound (1C) can be synthesized.

Scheme 4: Compound in which Z is ——(CF$_2$)$_2$——

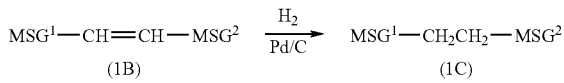

As shown below, diketone (S6) is fluorinated with sulfur tetrafluoride in the presence of a hydrogen fluoride catalyst according to a method described in *J. Am. Chem. Soc., 123,* 5414 (2001), whereby a compound (1D) having —(CF$_2$)$_2$— can be synthesized.

Scheme 5: Compound in which Z is ——(CH$_2$)$_4$——

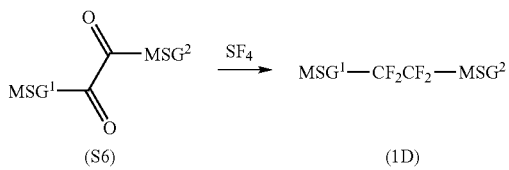

As shown below, a phosphonium salt (S7) is used in place of the phosphonium salt (S5) to synthesize a compound having —(CH$_2$)$_2$—CH═CH— according to the method shown in Scheme 2, and this is catalytically hydrogenated, whereby a compound (1E) can be synthesized.

Scheme 6: Compound in which Z is ——CH$_2$O—— or ——OCH$_2$——

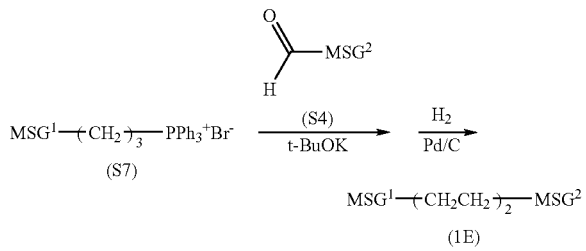

As shown below, the compound (S4) is first reduced by a reducing agent such as sodium boron hydride and the like to obtain a compound (S8). This compound is halogenated by hydrobromic acid and the like to obtain a compound (S9). Then, the compound (S9) is reacted with a compound (S10) in the presence of potassium carbonate and the like, whereby a compound (1F) can be synthesized. A compound having —CH$_2$O— can be synthesized as well by this method.

Scheme 7: Compound in which Z is ——COO—— or ——OCO——

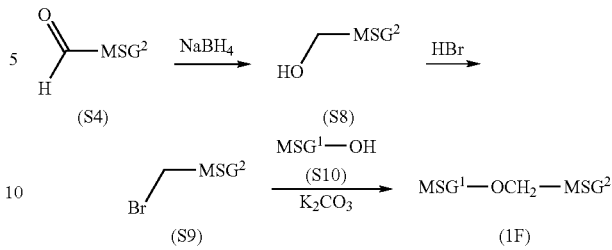

As shown below, the compound (S3) is reacted with n-butyllithium and then with carbon dioxide to obtain carboxylic acid (S11). The compound (S11) and phenol (S10) are subjected to dehydration in the presence of DCC (1,3-dicyclohexylcarbodiimide) and DMAP (4-dimethylaminopyridine), whereby a compound (1G) having —COO— can be synthesized. A compound having —OCO— can be synthesized as well by this method. Further, the compound (S11) is reacted with thionyl chloride or oxalyl chloride to be derived into an acid chloride compound, and then it is reacted with the compound (S10) in the presence of a base such as pyridine, triethylamine and the like, whereby the compound (1G) can be synthesized as well.

Scheme 8: Compound in which Z is ——CF═CF——

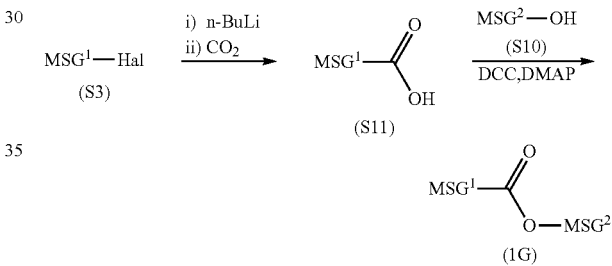

As shown below, the compound (S3) is first treated with n-butyllithium and then reacted with tetrafluoroethylene to obtain a compound (S12). Then, after the compound (S2) is treated with n-butyllithium, it is reacted with the compound (S12), whereby a compound (1H) can be synthesized. Selection of the synthetic conditions makes it possible to produce as well the compound (1H) of a cis body.

Scheme 9: Compound in which Z is ——C≡C——

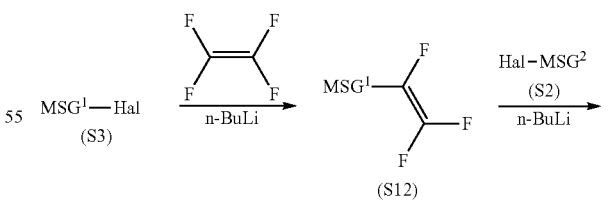

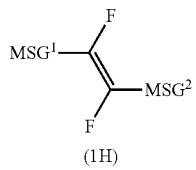

As shown below, a compound (S13) is reacted with the compound (S2) in the presence of a catalyst of dichloropalladium and copper halide, whereby a compound (1J) can be synthesized.

Scheme 10: Compound in which Z is ——C≡C—COO——

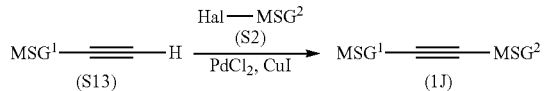

As shown below, the compound (S13) is subjected to lithiation with n-butyllithium and then reacted with carbon dioxide to obtain carboxylic acid (S14). Then, the carboxylic acid (S14) and the phenol (S10) are subjected to dehydration in the presence of DCC and DMAP, whereby a compound (1 K) having —C≡C—COO— can be synthesized. A compound having —OCO—C≡C— can be synthesized as well by this method. Further, as the compound (S11) is derived to the compound (1G) in Scheme 7, the compound (1K) can be synthesized as well through an acid chloride compound.

Scheme 11: Compound in which Z is ——C≡C—CH═CH—— or ——CH═CH—C≡C——

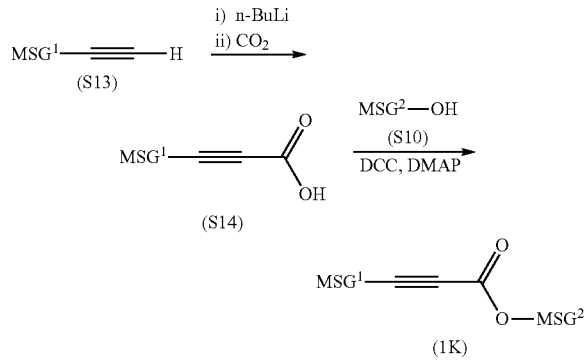

As shown below, a compound (1L) having —C≡C—CH═CH— can be synthesized by cross coupling reaction of the compound (S13) with vinyl bromide (S15). Use of the compound (S15) of a cis body makes it possible to produce the compound (1L) of a cis body.

Scheme 12: Compound in which Z is ——CF$_2$O—— or ——OCF$_2$——

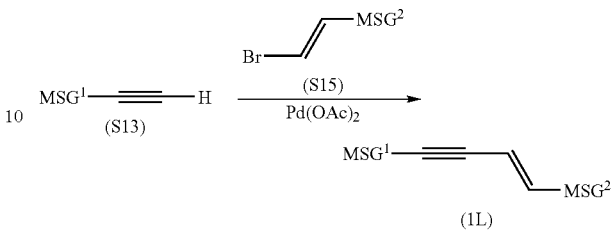

As shown below, the compound (1G) is first treated with a sulfurizing agent such as a Lawson reagent to obtain a compound (S16). Then, a hydrogen fluoride pyridine complex and NBS (N-bromosuccinimide) are used to fluorinate the compound (S16), whereby a compound (1M) having —CF$_2$O— can be synthesized. Further, the compound (1M) can be synthesized as well by fluorinating the compound (S16) by (diethylamino)sulfate trifluoride (DAST). A compound having —OCF$_2$— can be synthesized as well by this method. The above bonding groups can be formed as well by a method described in P. Kirsch et al., *Angew. Chem. Int. Ed.*, 40, 1480 (2001).

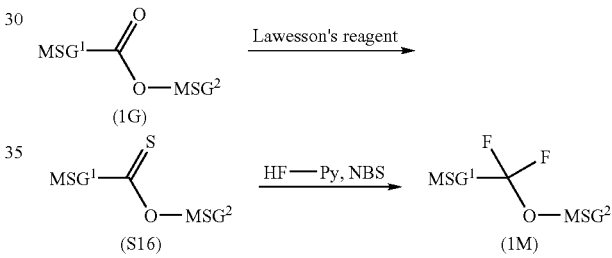

The examples (Compound (a-1) to Compound (d-10)) of the compounds synthesized by the methods described above are shown below. The structures of the compounds synthesized in the manners described above can be confirmed by, for example, a proton NMR spectrum and the like.

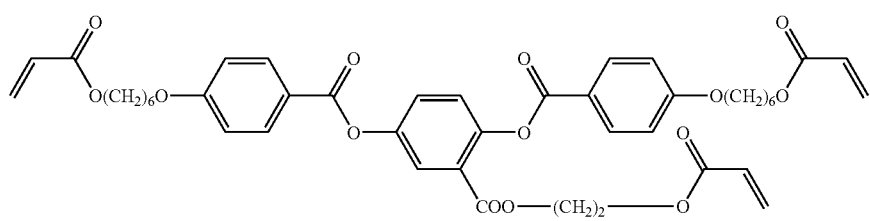

a-1

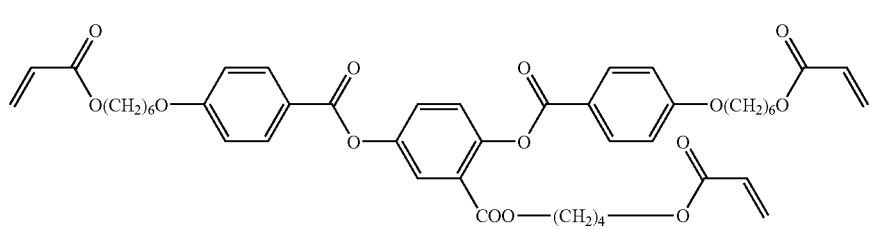

a-2

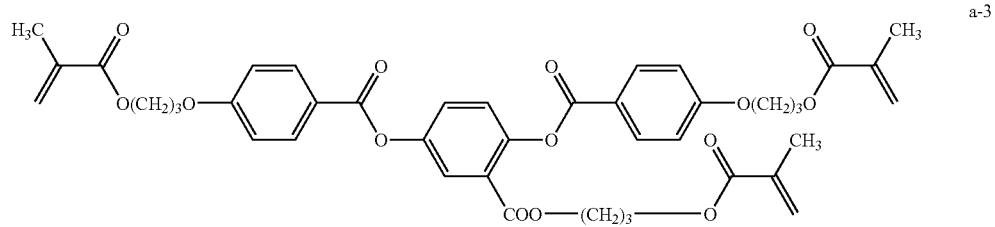
a-3
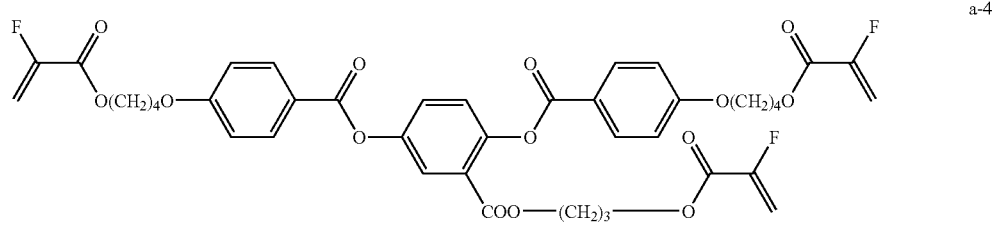
a-4
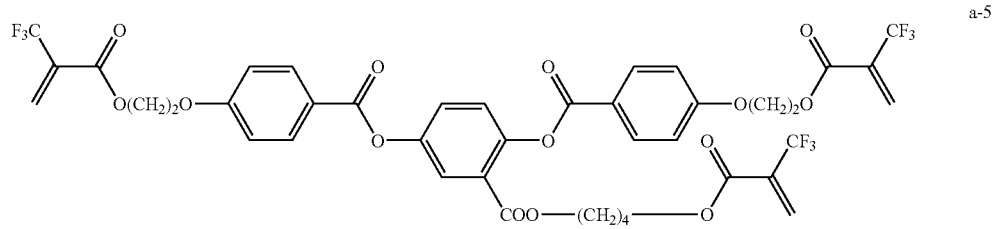
a-5
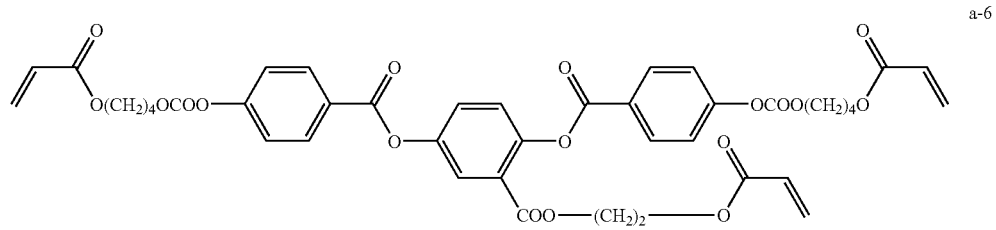
a-6
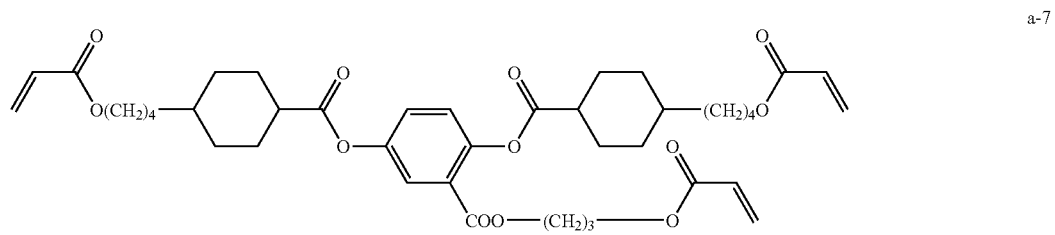
a-7
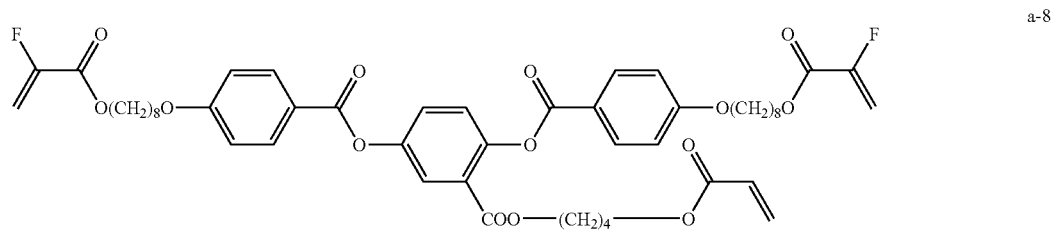
a-8
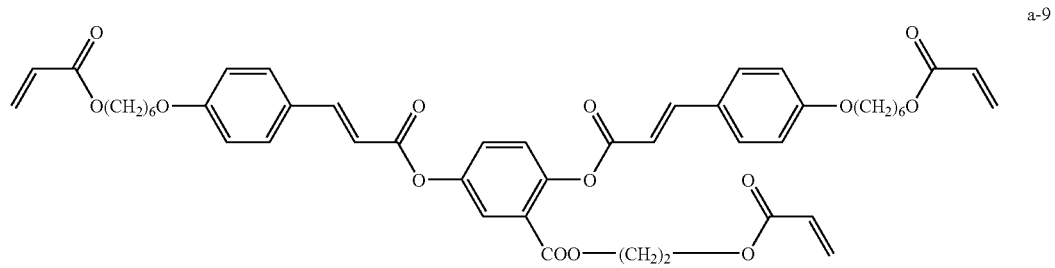
a-9

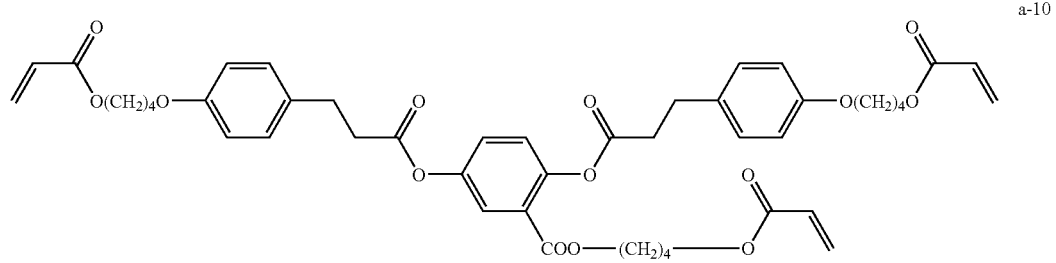
a-10
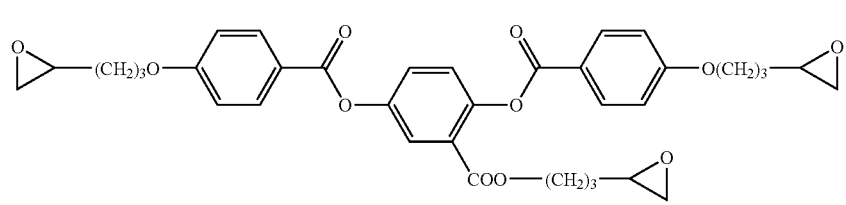
b-1
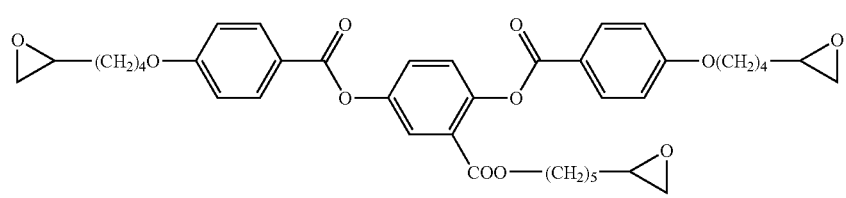
b-2
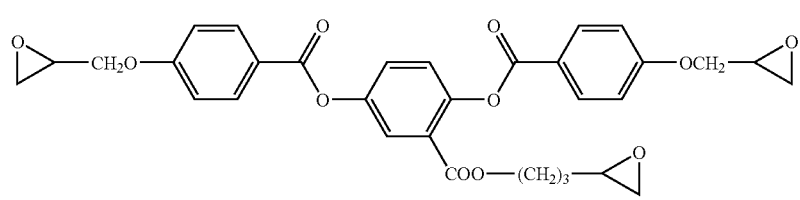
b-3
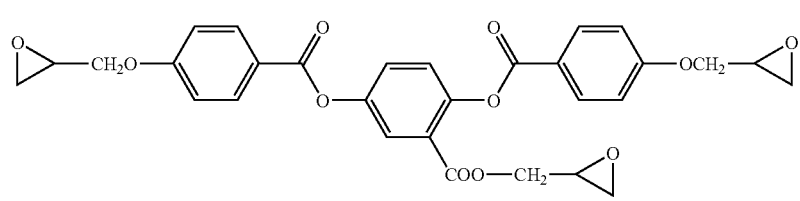
b-4
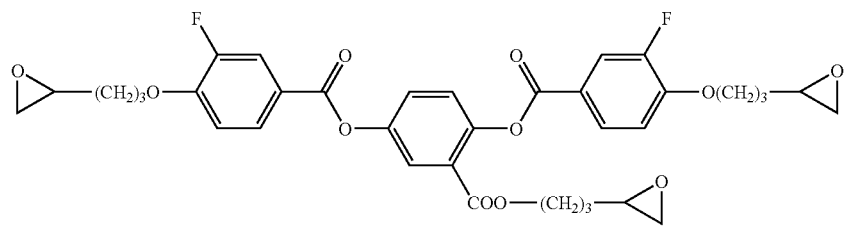
b-5
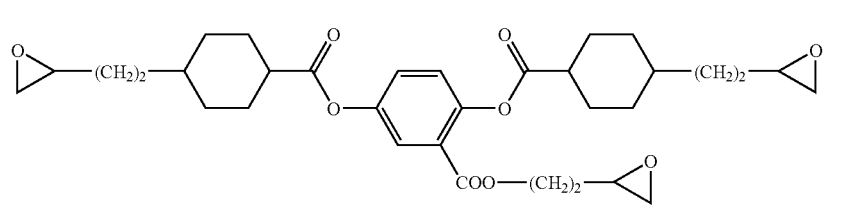
b-6

-continued
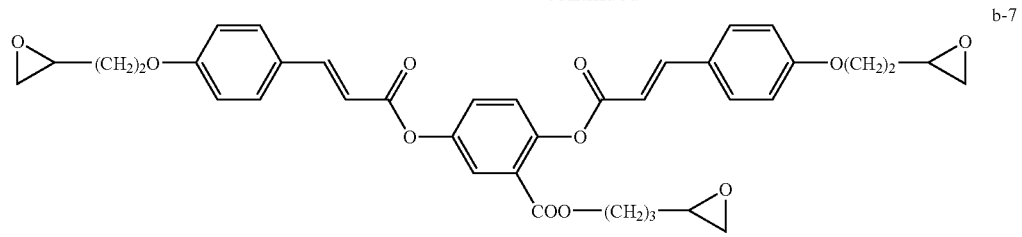
b-7
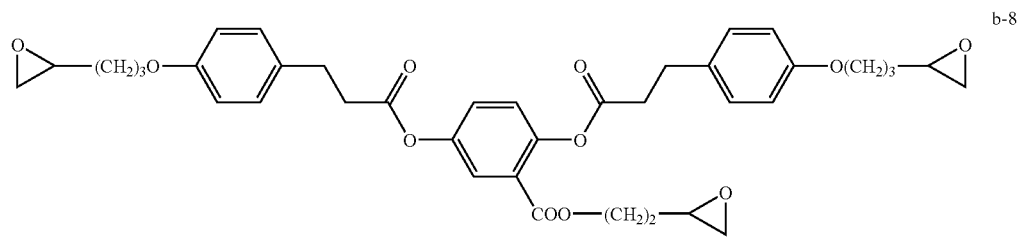
b-8
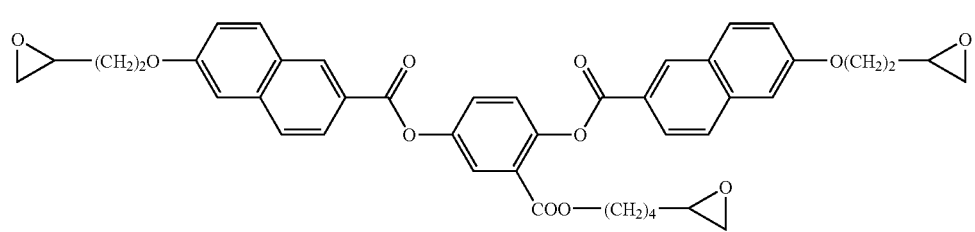
b-9
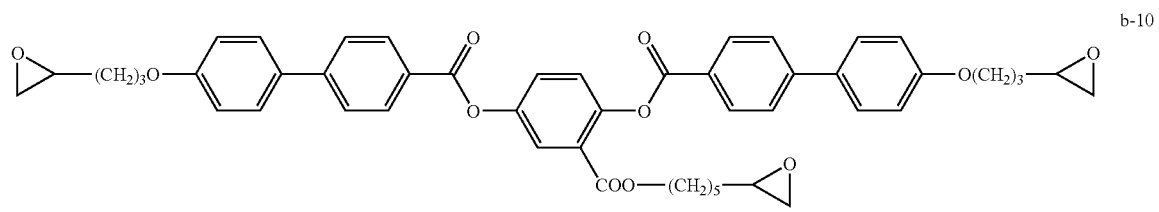
b-10
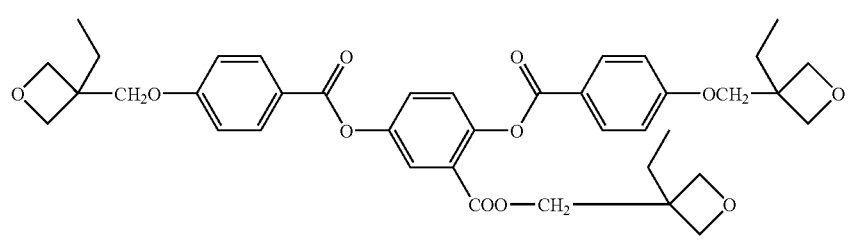
c-1
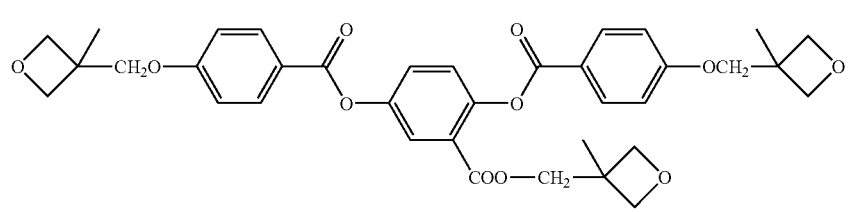
c-2
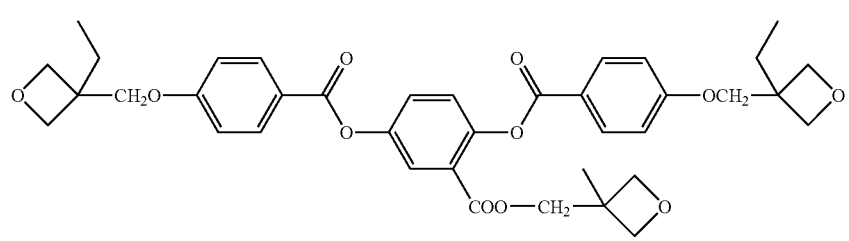
c-3

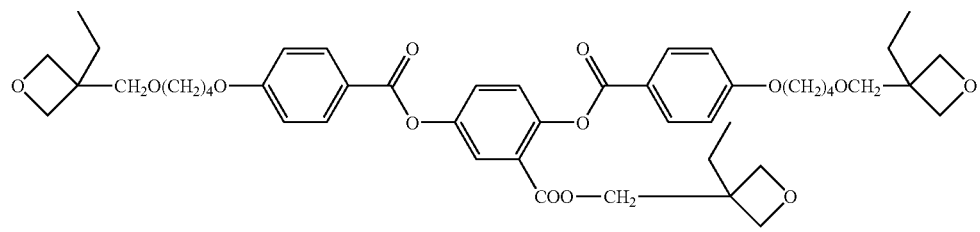
c-4
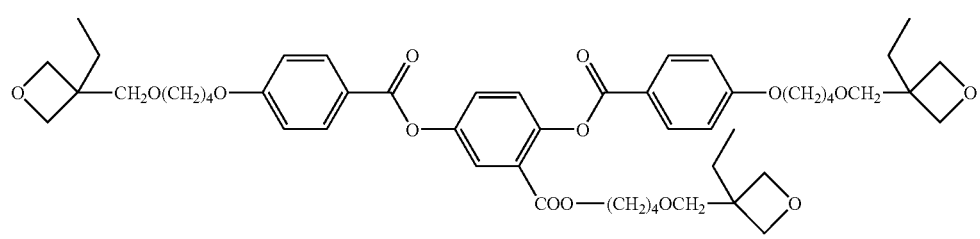
c-5
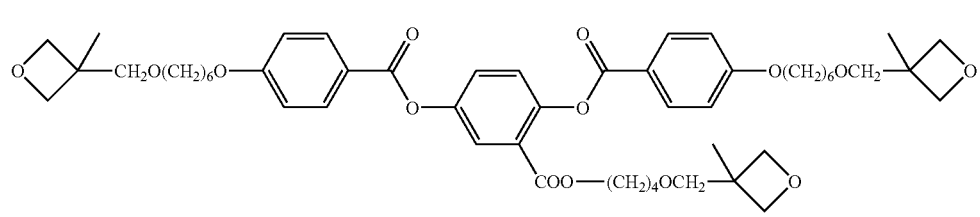
c-6
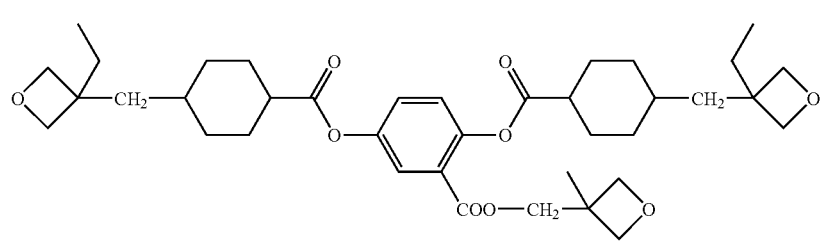
c-7
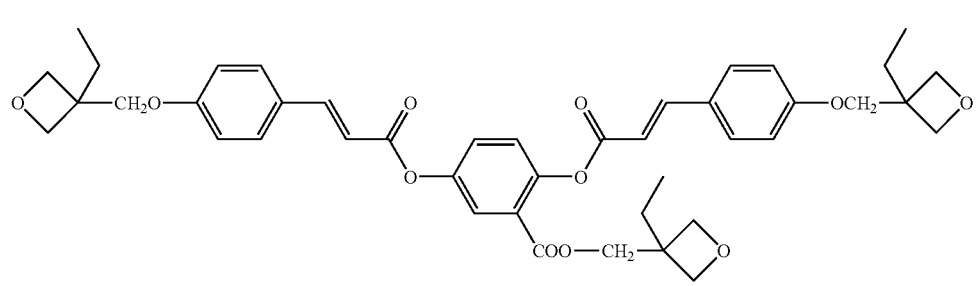
c-8
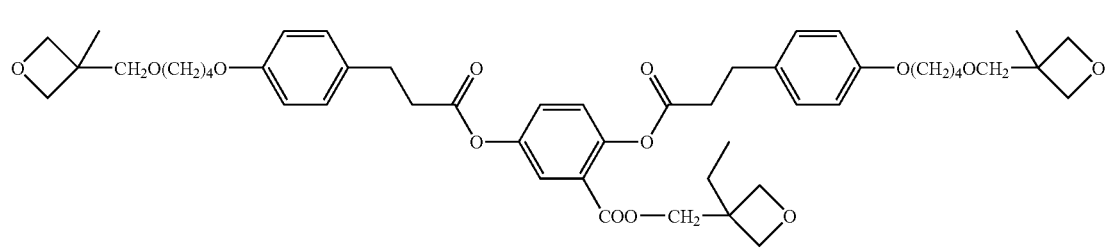
c-9

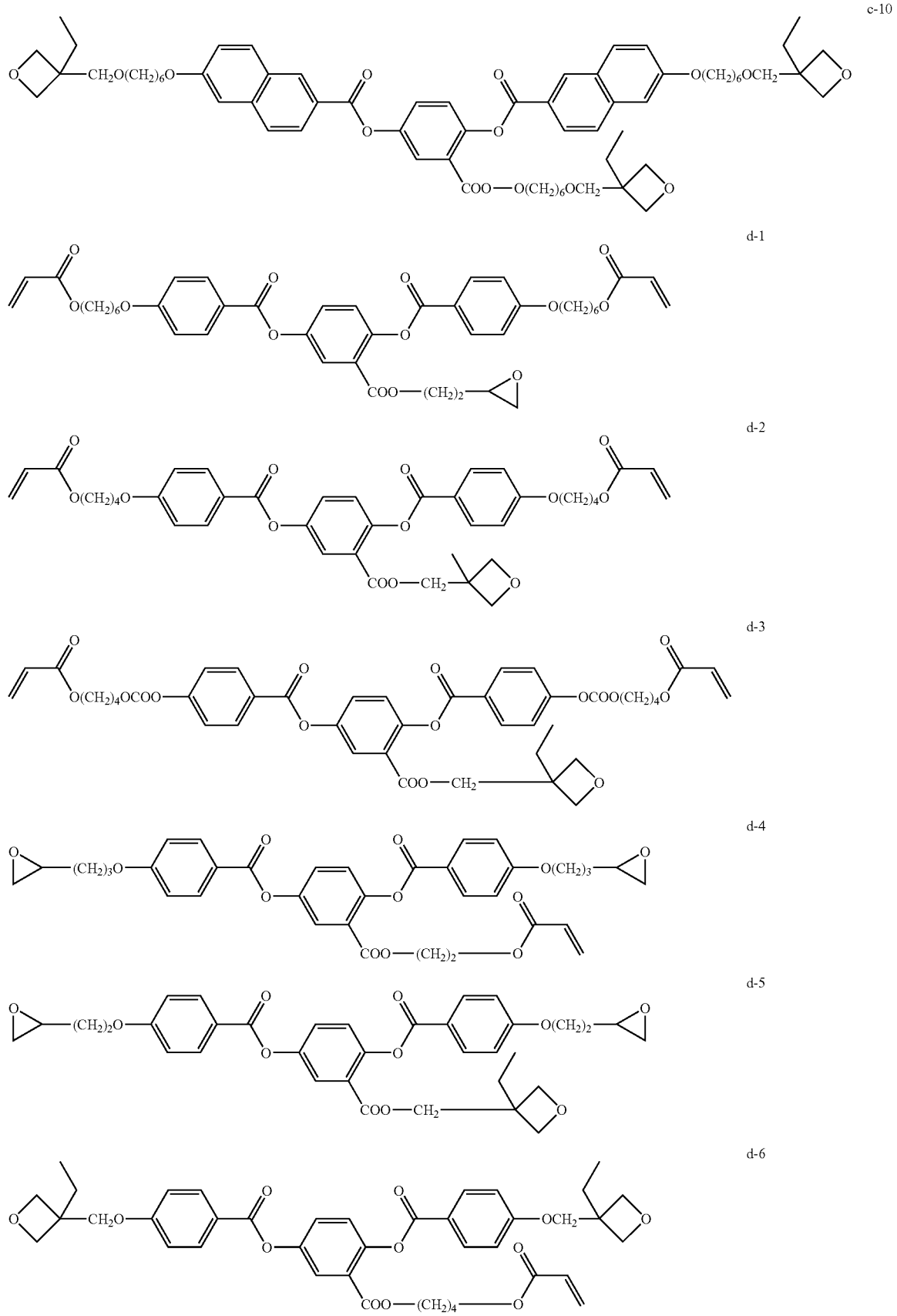

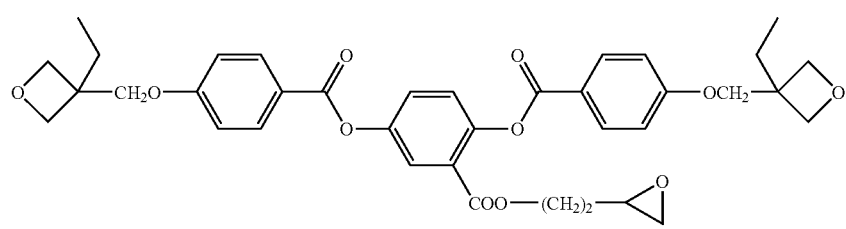

d-7

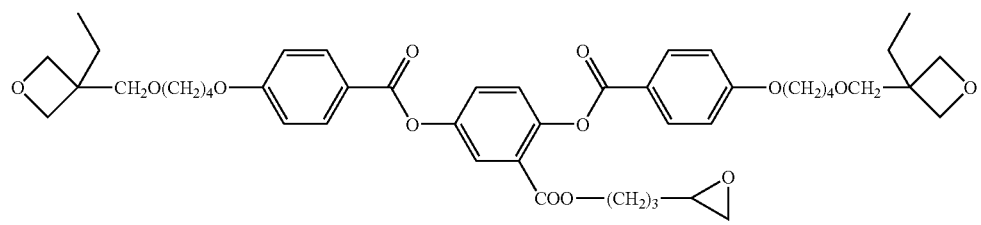

d-8

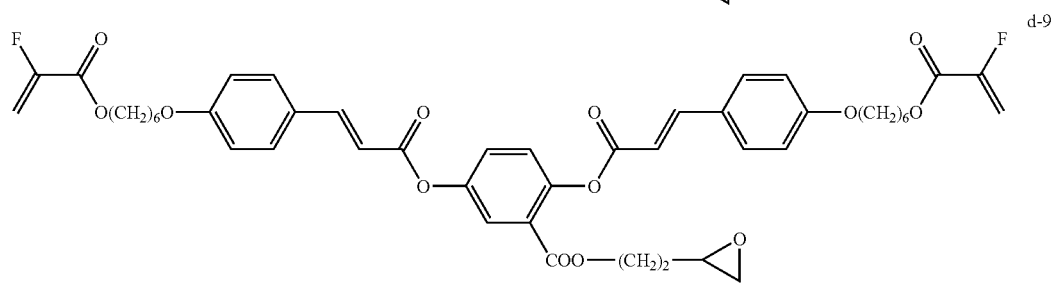

d-9

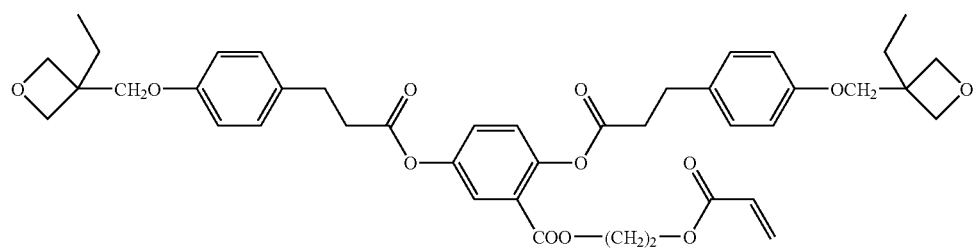

d-10

Composition

The composition (1) of the invention has characteristics such as a good coating property and the like. The first embodiment of the composition of the invention includes one compound (1). A homopolymer is obtained by polymerizing this composition. The second embodiment thereof includes at lest two compounds selected from the compounds (1). A copolymer is obtained by polymerizing the composition thereof. These compositions may further include additives. The third embodiment thereof includes at lest one compound (1) and other polymerizable compounds. The other polymerizable compounds are compounds having polymerizable groups but different from compound (1). A copolymer is obtained as well by polymerizing the composition thereof. The composition (1) of the invention may further include additives such as a liquid crystalline compound, an optically active compound, a polymerization initiator, a solvent, a surfactant, an antioxidant, a UV absorber and the like. These additives shall be explained in the order of (1) other polymerizable compounds, (2) a liquid crystalline compound, (3) an optically active compound, (4) a polymerization initiator, (5) a solvent, (6) a surfactant, (7) an organosilicon compound, (8) an antioxidant and (9) a UV absorber.

Other Polymerizable Compounds

The composition (1) may include other polymerizable compounds. The other polymerizable compounds are preferably compounds which do not reduce a film forming property and a mechanical strength. The above compounds are classified into compounds having no liquid crystallinity and compounds having a liquid crystallinity.

The other polymerizable compounds having no liquid crystallinity include vinyl derivatives, styrene derivatives, (meth)acrylic acid derivatives, oxirane derivatives, oxetane derivatives, sorbic acid derivatives, fumaric acid derivatives, itaconic acid derivatives and the like. The above compounds are suited for controlling a viscosity and orientation of the composition and have a large effect of making a thickness of a coating film even in applying the composition.

The specific examples of the other polymerizable compounds having no liquid crystallinity include non-liquid crystalline multifunctional acrylate monomers such as 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, pentaerythritol tetraacrylate, trisacryloxyethyl phosphate, bisphenol A EO-added diacrylate, bisphenol A glycidyl diacrylate (trade name: Biscoat 700, manufactured by Osaka Organic Chemical Industry Ltd.), polyethylene glycol diacrylate and compounds (N-1) to compounds (N-10) shown below. The above compounds are added to the composition of the invention and used in a certain case in order to control a viscosity and orientation of the composition and increase the hardness of the polymer.

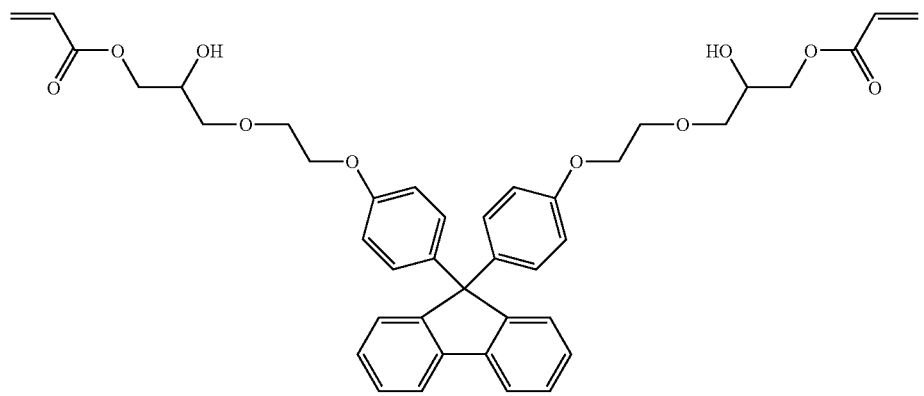
(N-1)
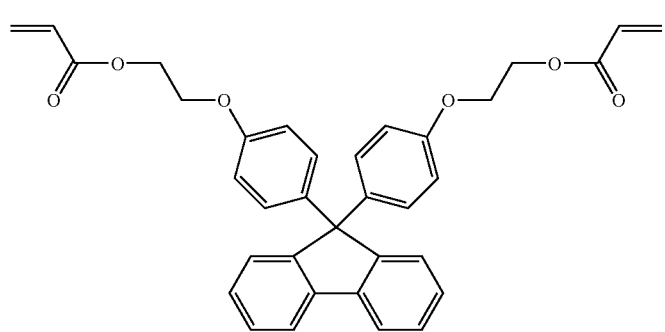
(N-2)
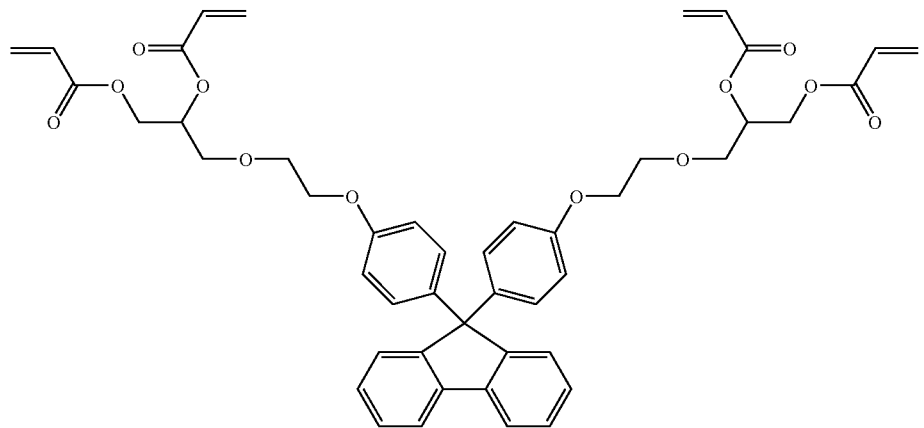
(N-3)
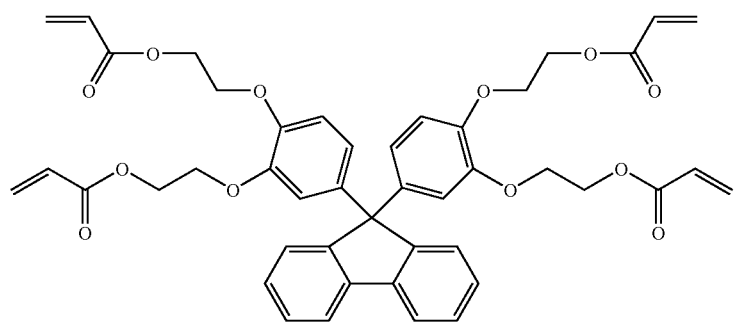
(N-4)

-continued

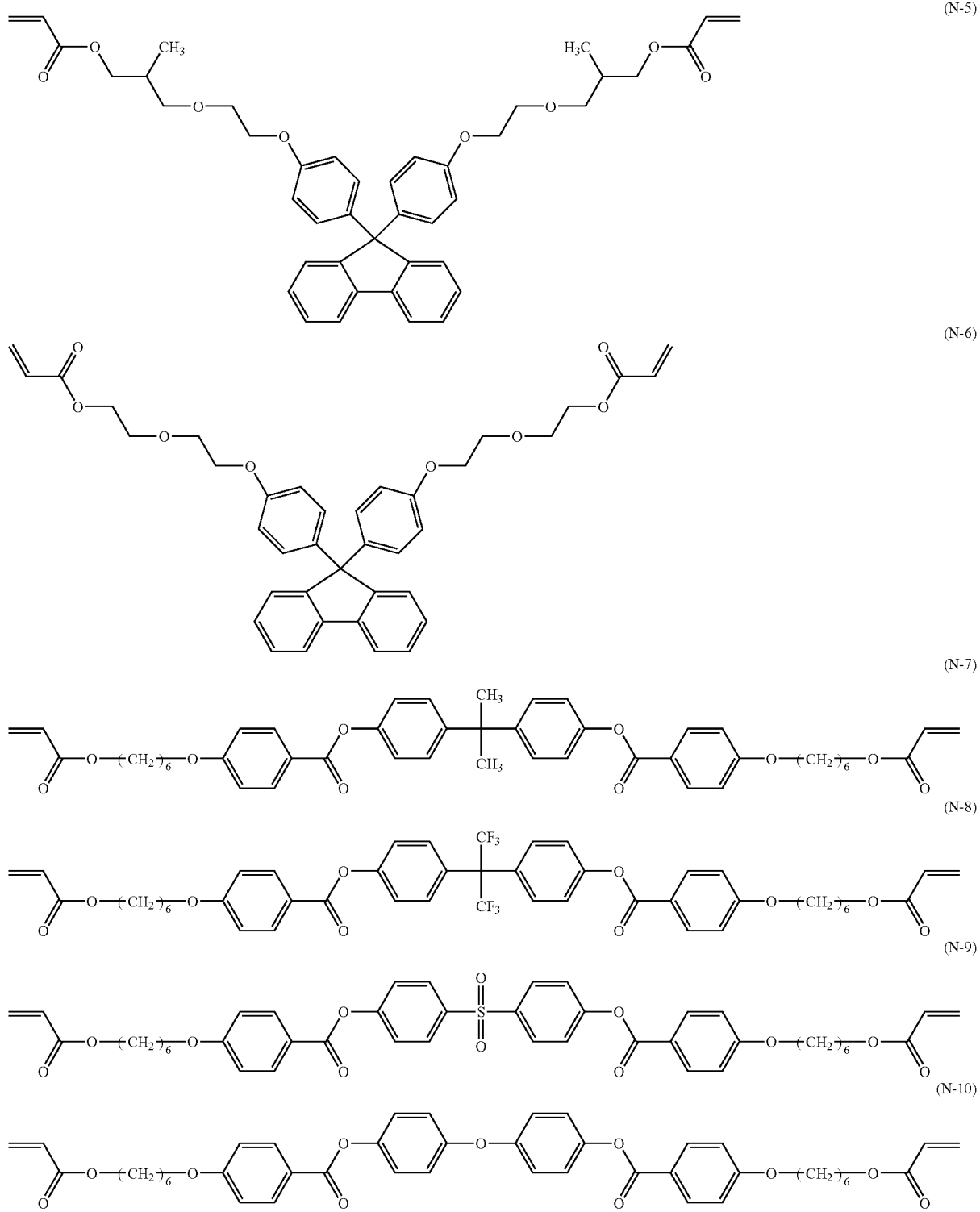

The other polymerizable compound having a liquid crystallinity is preferred as well for controlling the temperature range of a liquid crystal phase, the optical anisotropy, the coating property and the like in the composition (1). Capable of being used are compounds which are crystalline compounds having an acryloyloxy group, a methacryloyloxy group, a fumaroyloxy group, a maleimidyl group, an oxirane ring or an oxetane ring as a functional group and which are not the compound (1).

A constitutional unit derived from a compound other than the composition (1) is preferably included in a range of approximately 5 to approximately 95 mole %, more preferably approximately 60 to approximately 95 mole % in order to maintain the characteristics of the polymer of the invention and allow the characteristics of the copolymer described above to be notably developed. The constitutional unit having a liquid crystallinity and the constitutional unit having no liquid crystallinity can freely be changed within the range described above, and the total amount thereof falls preferably in the range described above. Further, either of them may be included.

The preferred examples of the other polymerizable compound having a liquid crystallinity include compounds represented by Formulas (M1) to (M3).

The compounds (M1), (M2) and (M4) show a broad liquid crystallinity-developing property, and in addition thereto, two polymerizable groups present in the structures thereof make it possible to form a three-dimensional network structure, which results in making it possible to form a polymer having a high mechanical strength. The compound (M3) is monofunctional, and a substituent such as a polar group and the like can be introduced into a side opposite to a polymerizable group in a molecular long chain direction to make it possible to adjust control of orientation in a liquid crystal state. In any of the compounds (M1) to (M4), the composition having high an can be prepared when the ring structure $A^1$ is 1,4-phenylene, and the composition having low an can be prepared when it is 1,4-cyclohexylene.

The preferred examples of the compounds (M1), (M2), (M3) and (M4) include compounds (M1-1) to (M1-8), compounds (M2-1) to (M2-12), compounds (M3-1) to (M3-25) and compounds (M4-1) to (M4-2) each shown below.

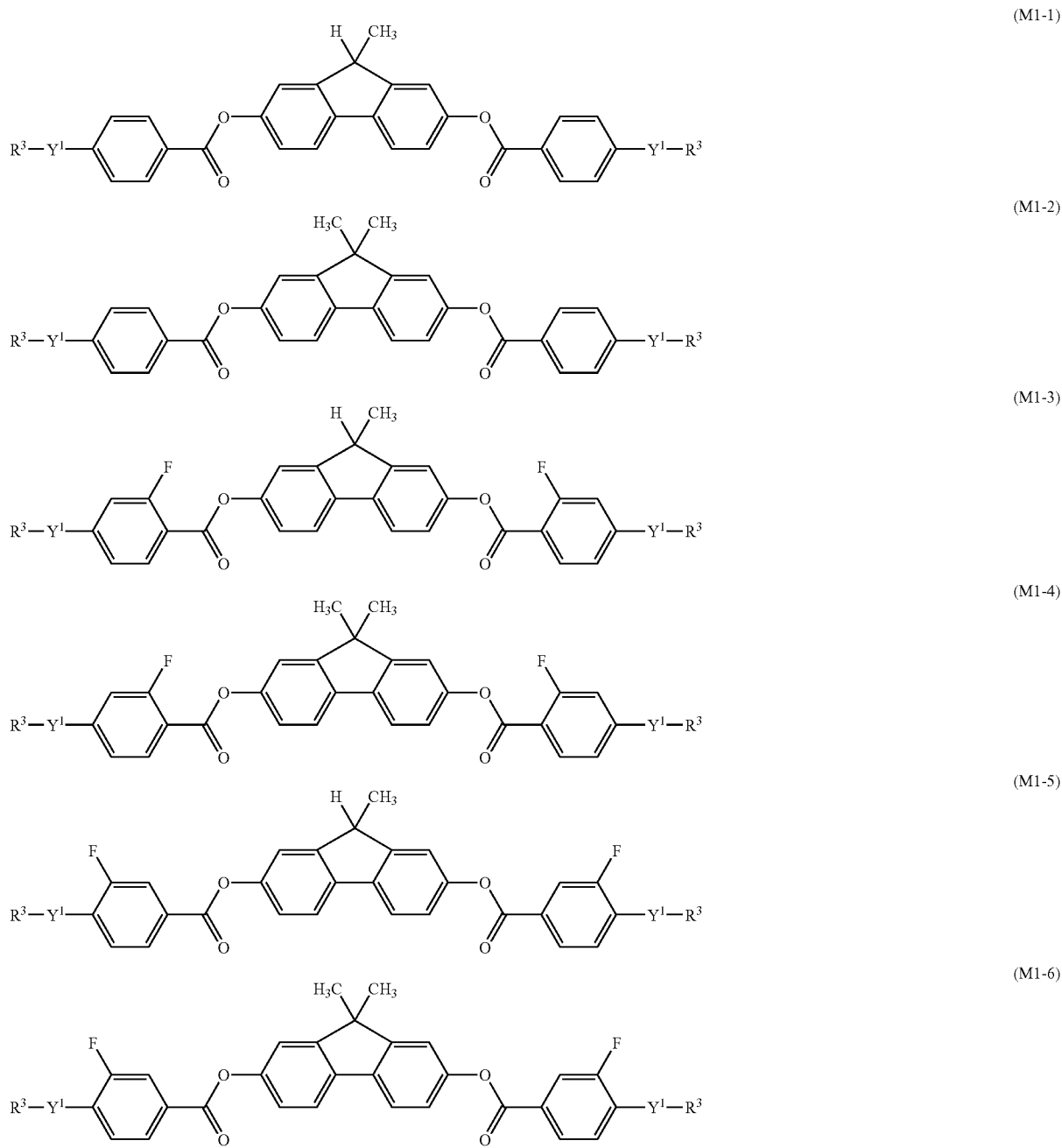

-continued
(M1-7)
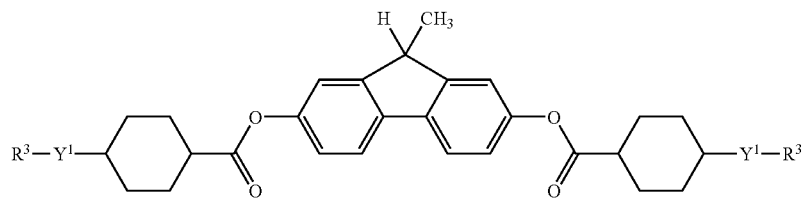
(M1-8)
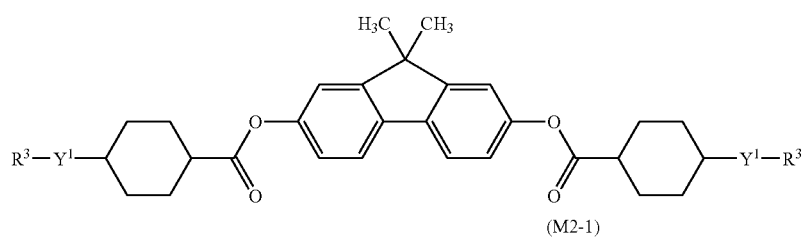
(M2-1)
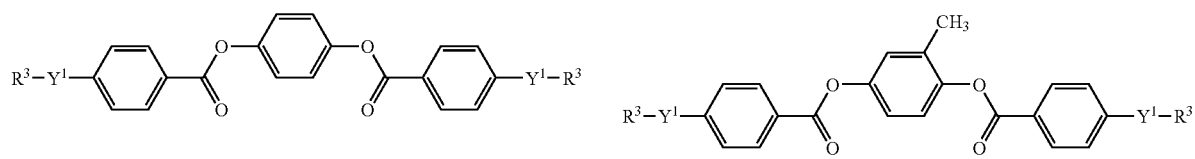
(M2-2)
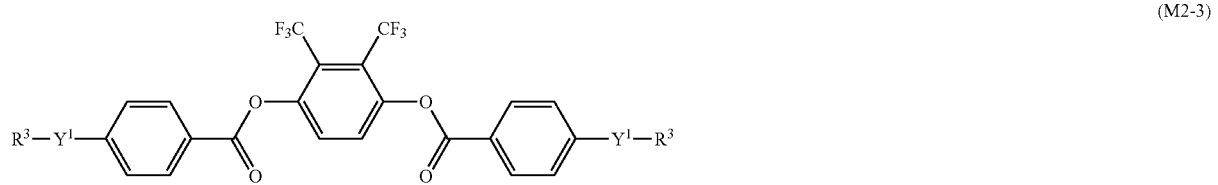
(M2-3)
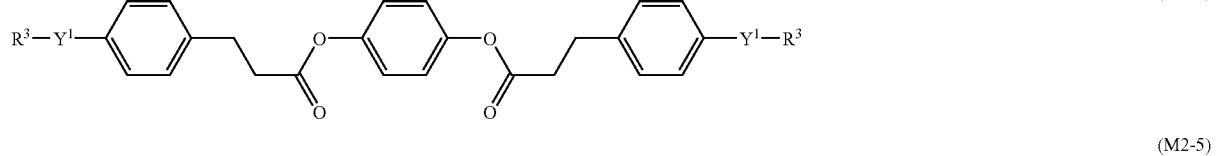
(M2-4)
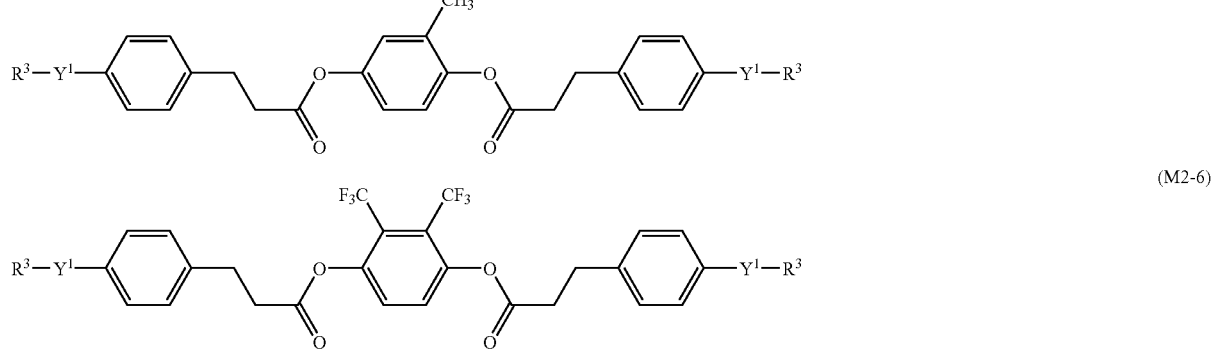
(M2-5)
(M2-6)
(M2-7)
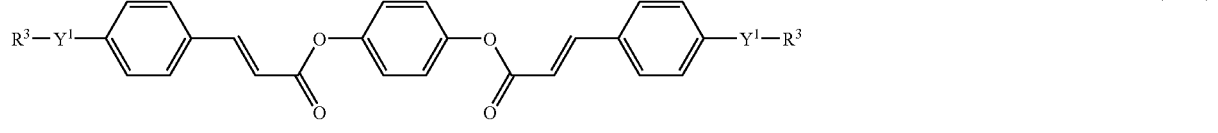
(M2-8)
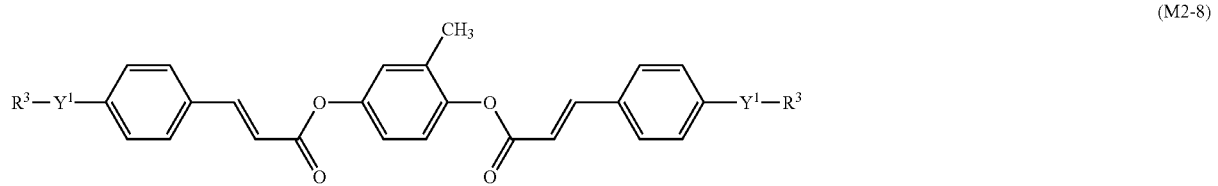

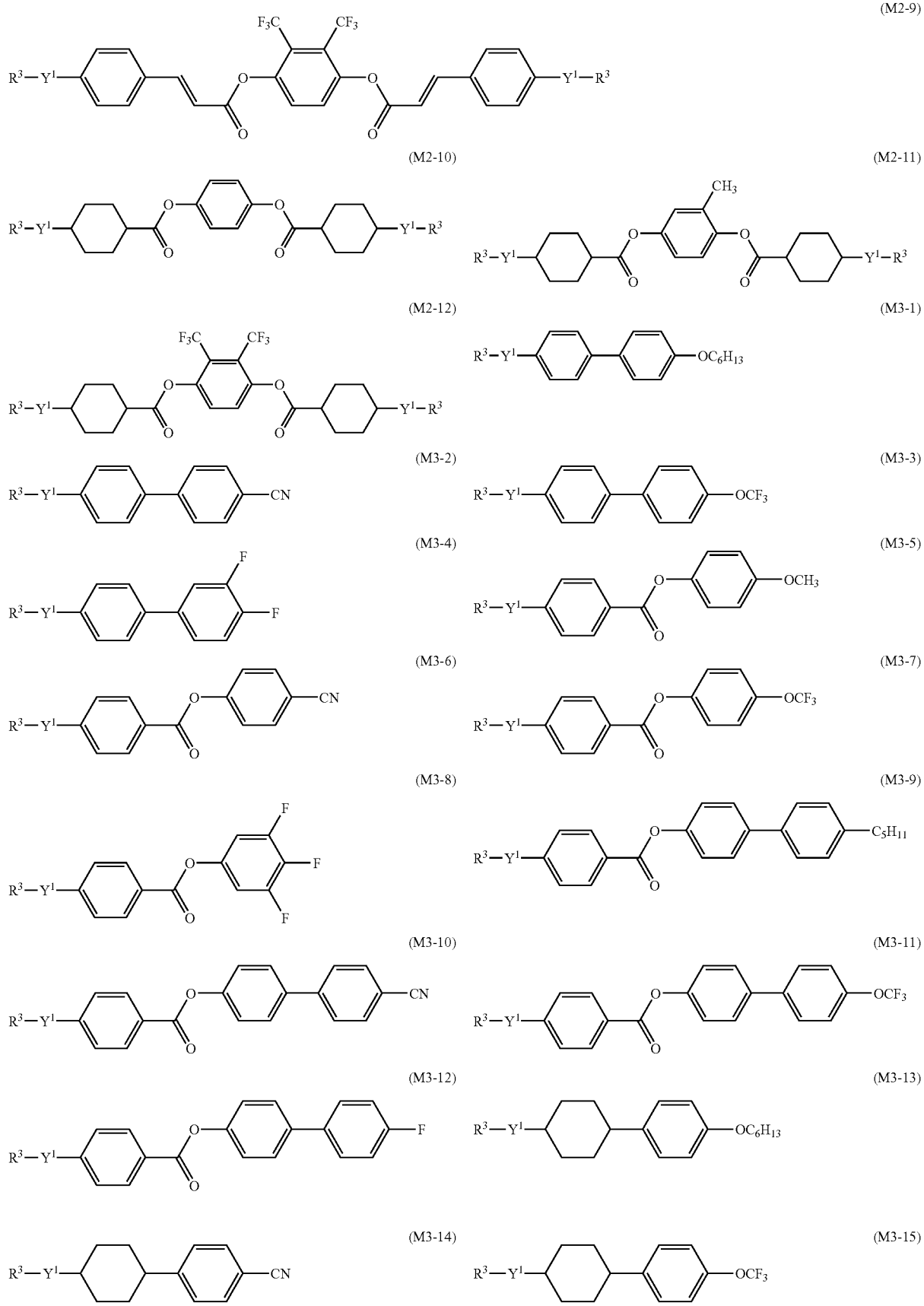

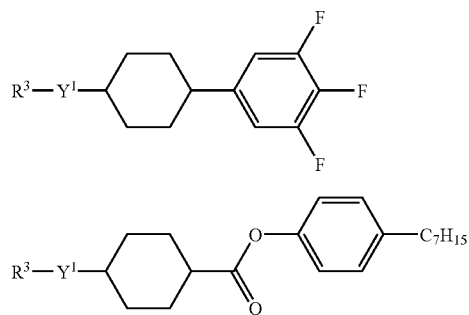
(M3-16)
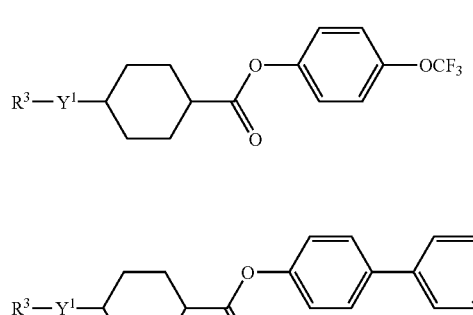
(M3-18)
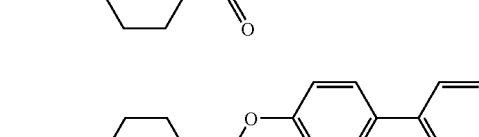
(M3-20)
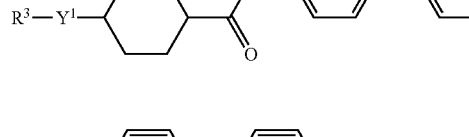
(M3-22)
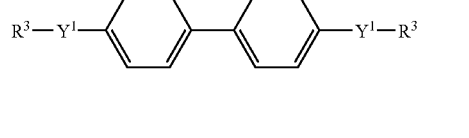
(M3-24)
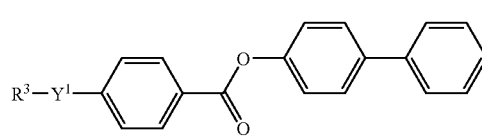
(M4-1)
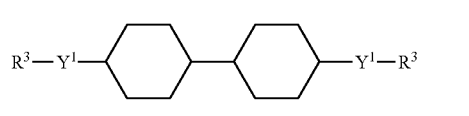
(M4-3)
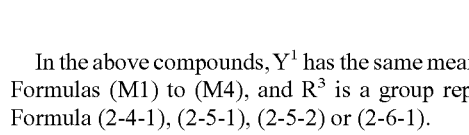
(M4-5)
-continued
(M3-17)
(M3-19)
(M3-21)
(M3-23)
(M3-25)
(M4-2)
(M4-4)
In the above compounds, Y¹ has the same meaning as Y¹ in Formulas (M1) to (M4), and R³ is a group represented by Formula (2-4-1), (2-5-1), (2-5-2) or (2-6-1).
(2-4-1)
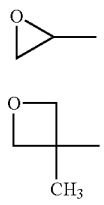
(2-5-1)
-continued
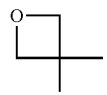
(2-5-2)
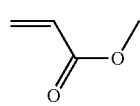
(2-6-1)
Liquid Crystalline Compound
The composition (1) may include a liquid crystalline compound having no polymerizable group. The examples of such non-polymerizable liquid crystalline compound are described in LiqCryst (LCI Publisher Gmbh, Hamburg, Germany) and the like which are data base for liquid crystalline compounds. The compound (1) has characteristics such as a broad temperature range of a liquid crystal phase, a good compatibility with other liquid crystalline compounds and the like. Accordingly, the composition (1) including the liquid crystalline compound can be used as a liquid crystal composition filled into a liquid crystal display element. The above composition (1) may further include additives such as dichroic coloring matter and the like. A composite material of the polymer of the compound (1) and the liquid crystalline compound can be obtained by polymerizing the composition (1) including the liquid crystalline compound.

Optically Active Compound

The composition (1) may include an optically active compound. The composition including a suitable amount of a compound (1) having an optical activity or the composition obtained by adding a suitable amount of an optically active compound to the compound (1) which is not optically active is applied on a substrate subjected to alignment treatment and polymerized, whereby a retardation film having a helical structure (twist structure) is obtained. The above helical structure is fixed by polymerizing the compound (1). The characteristics of the resulting molded article having an optical anisotropy depend on the pitches of the helical structure obtained. This helical pitch length can be controlled by the kind of optically active compound and an addition amount thereof. Only one optically active compound may be added, and plural optically active compounds may be used for the purpose of canceling out a temperature dependency of the helical pitch. A polymerizable compound other than the compound (1) in addition to the compound (1) and the optically active compound may be included in the composition (1).

In selective reflection of visible light, which is a characteristic of the molded article having an optical anisotropy described above, the helical structure works on an incident light to reflect a circularly polarized light and an elliptically polarized light. The selective reflection characteristic is shown by $\lambda = n \cdot Pitch$ ($\lambda$ is a selective reflection central wavelength; n is an average refractive index; and Pitch is a helical pitch), and therefore $\lambda$ and a band ($\Delta\lambda$) thereof can suitably be controlled by n or Pitch. The color purity can be improved by reducing $\Delta\lambda$, and reflection in a broad band can be obtained by increasing $\Delta\lambda$. Further, an effect of the cell thickness is exerted as well on the above selective reflection to a large extent. In order to maintain the color purity, the cell thickness has to be controlled so that it is not too small. In order to maintain an evenness of the orientation, the cell thickness has to be controlled so that it is not too large. Accordingly, the cell thickness has to be suitably controlled, and it is preferably approximately 0.5 to approximately 25 µm, more preferably approximately 0.5 to approximately 5 µm.

A negative type c plate (c-plate) described in W. H. de Jeu, PHYSICAL PROPERTIES OF LIQUID CRYSTALLINE MATERIALS, Gordon and Breach, New York (1980) can be prepared by making the helical pitch shorter than a wavelength of a visible light. The helical pitch can be shortened by using an optically active compound having a large helical twisting power (HTP) and increasing an addition amount thereof. To be specific, the negative type c plate can be prepared by controlling the helical pitch to approximately 350 nm or less, preferably approximately 200 nm or less. The above negative type c plate is an optical compensator suited to display elements of a VAN type, a VAC type, an OCB type and the like among liquid crystal display elements.

Any optically active compounds may be used for the optically active compound described above as long as they induce a helical structure and can suitably be mixed with the polymerizable liquid crystal composition which is the base. The optically active compound may be either a polymerizable compound or a non-polymerizable compound, and the optimum compound can be added according to the purposes. When considering the heat resistance and the solvent resistance, the polymerizable compound is rather suited. Further, the compound having a large helical twisting power (HTP) out of the optically active compounds described above is suited for shortening the helical pitch. The representative examples of the compound having a large helical twisting power are disclosed in GB2298202 and DE10221751.

Optically active compounds (Op-1) to (Op-19) shown below are suited as the optically active compound described above, and the compounds (Op-14) to (Op-19) are particularly suited. In the formulas, $R^c$ represents polymerizable or non-polymerizable alkyl or alkoxy having 1 to 10 carbon atoms, and a $CH_3$ group at an end of the chain may be replaced by a polymerizable group. Plural $R^c$ may be the same or different. Carbons affixed with "*" are asymmetric carbons.

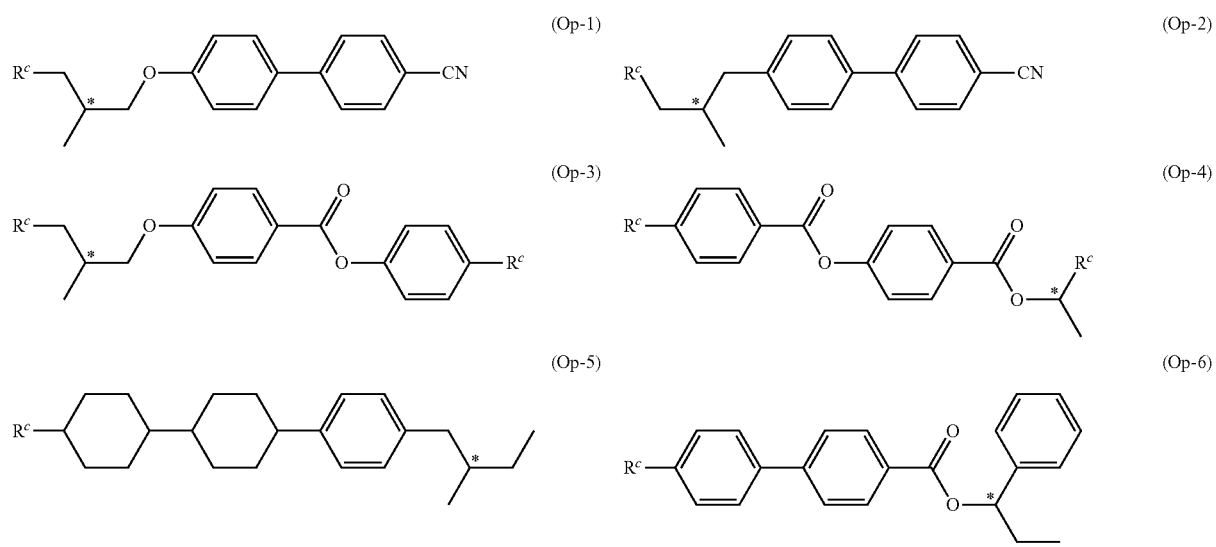

-continued
(Op-7)
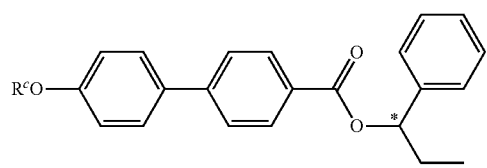
(Op-8)
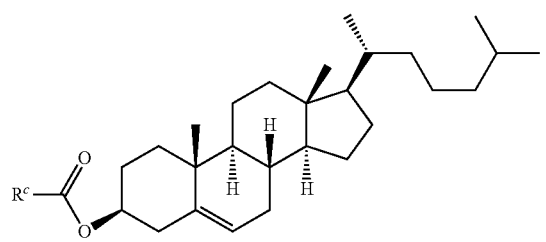
(Op-9)
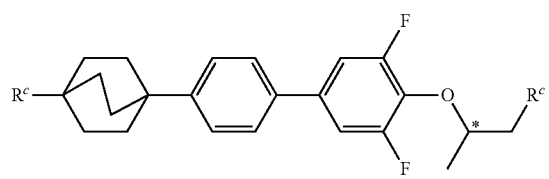
(Op-10)
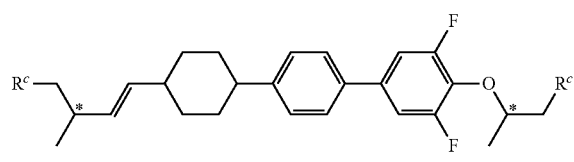
(Op-11)
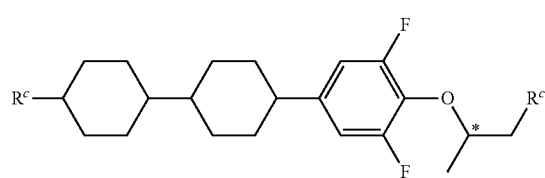
(Op-12)
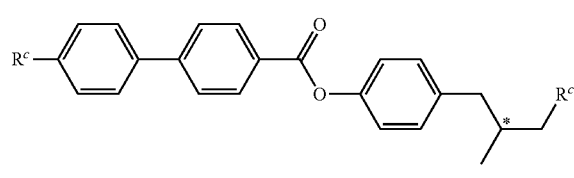
(Op-13)
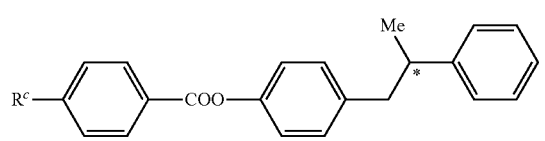
(Op-14)
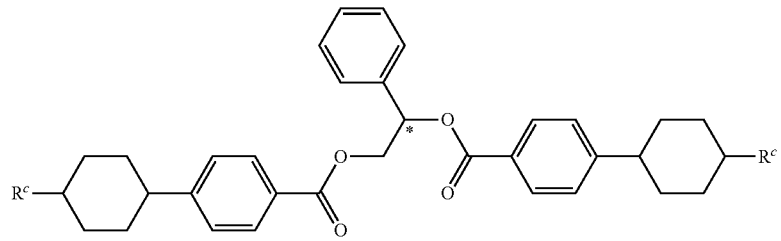
(Op-15)
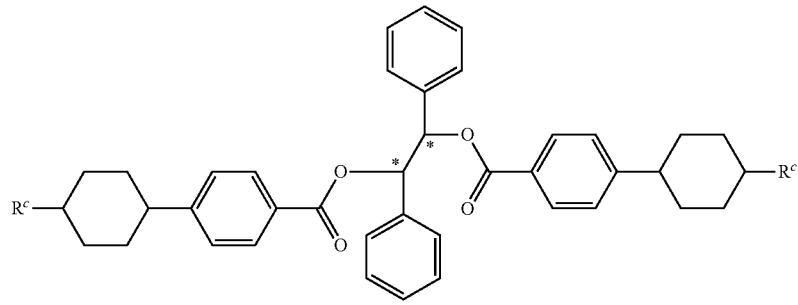
(Op-16)
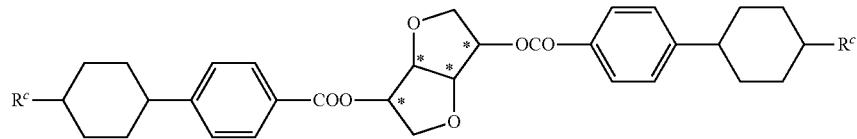

(Op-17)

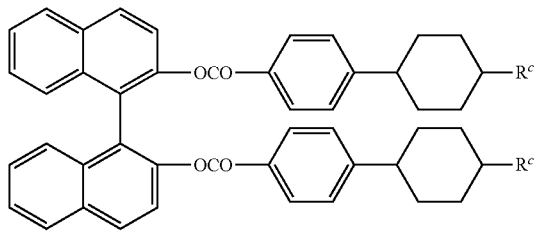

(Op-18)

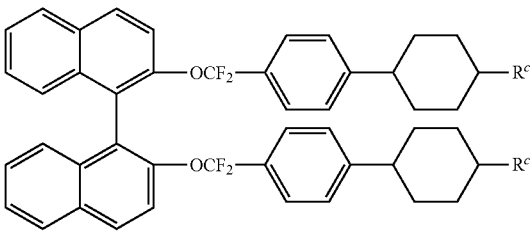

(Op-19)

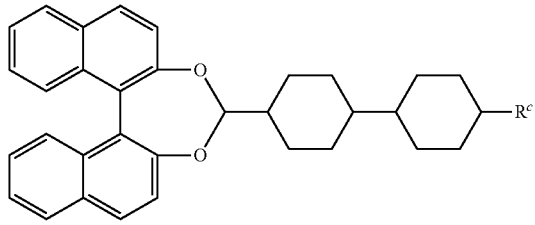

Polymerization Initiator

The composition (1) may include a polymerization initiator. The polymerization initiator can be selected according to the kind of polymerization, and the preferred initiators are shown below.

The optical radical polymerization initiator includes, for example, 1173 and 4265 out of a Darocure series of Ciba Specialty Chemicals K. K. and 184, 369, 500, 651, 784, 819, 907, 1300, 1700, 1800, 1850 and 2959 out of an Irgacure series, and any of publicly known compounds can be used as well.

Other optical radical polymerization initiators include, for example, 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, benzophenone/Michler's ketone mixtures, hexaarylbiimidazole/mercaptobenzimidazole mixtures, 1-(4-isopropylphenyl)-2-hydroxy-2-methylpropane-1-one, benzyl dimethyl ketal, 2-methyl-1-[4-(methylthio)phenyl]-2-morpholinopropane-1-one, 2,4-diethylxanthone/methyl p-dimethylaminobenzoate mixtures, benzophenone/methyltriethanolamine mixtures and the like, and any of publicly known compounds can be used as well.

The preferred examples of initiators used for radical polymerization initiated by heat include benzoyl peroxide, diisopropylperoxy dicarbonate, t-butylperoxy-2-ethyl hexanoate, t-butylperoxy pivalate, di-t-butyl peroxide, t-butylperoxy diisobutyrate, lauroyl peroxide, dimethyl 2,2'-azobisisobutyrate, azobisisobutyronitrile, azobiscyclohexanecarbonitrile and the like, and any of publicly known compounds can be used as well.

The preferred initiators for optical cationic polymerization include diaryliodonium salts (hereinafter abbreviated as "DAS"), triarylsulfonium salts (hereinafter abbreviated as "TAS") and the like.

DAS includes, for example, diphenyliodonium tetrafluoroborate, diphenyliodonium hexafluorophosphonate, diphenyliodonium hexafluoroarsenate, diphenyliodonium tetra(pentafluorophenyl)borate, 4-methoxyphenylphenyliodonium tetrafluoroborate, 4-methoxy phenylphenyliodonium hexafluorophosphonate, 4-methoxyphenylphenyliodonium hexafluoroarsenate, bis(4-tert-butylphenyl)iodoniumdiphenyliodonium tetrafluoroborate, bis(4-tert-butylphenyl)iodonium diphenyliodoniumhexafluoroarsenate, bis(4-tert-butylphenyl)iodoniumdiphenyliodonium trifluoromethanesulfonate and the like.

DAS is preferably combined with photosensitizers. Such photosensitizers include, for example, thioxanthone, phenothiazine, chlorothioxanthone, xanthone, anthracene, diphenylanthracene, rubrene and the like, and any of publicly known compounds can be used as well.

TAS includes, for example, triphenylsulfonium hexafluorophosphonate, triphenylsulfonium hexafluoroarsenate, triphenylsulfonium tetra(pentafluorophenyl)borate, 4-methoxy phenyldiphenylsulfonium tetrafluoroborate, 4-methoxyphenyldiphenylsulfonium hexafluoro phosphonate, 4-methoxyphenyldiphenylsulfonium hexafluoroarsenate, 4-methoxyphenyldiphenyl sulfonium trifluoromethanesulfonate, 4-methoxyphenyldiphenylsulfoniumtriphenylsulfonium tetra(pentafluorophenyl)borate, 4-phenylthiophenyldiphenylsulfonium tetrafluoroborate, 4-phenylthio phenyldiphenylsulfonium hexafluorophosphonate, 4-phenylthiophenyldiphenylsulfonium hexafluoroarsenate and the like, and any of publicly known compounds can be used as well.

Commercially available initiators used for optical cationic polymerization include, for example, "DTS-102" manufactured by Midori Chemical Co., Ltd., "Cyracure UVI-6990", "Cyracure UVI-6974" and "Cyracure UVI-6992" manufactured by UCC Ltd., "Adekaoptomer SP-150, SP-152, SP-170 and SP-172" manufactured by Asahi Denka Co., Ltd., "PHOTOINITIATOR 2074" manufactured by Rhodia Co., Ltd., "Irgacure 250" manufactured by Ciba Specialty Chemicals K. K., "UV-9380C" manufactured by GE Silicones Co., Ltd. and the like, and any of publicly known compounds can be used as well.

Amine base curing agents described in the GENERAL HANDBOOK EPOXY RESINS (edited by Epoxy Resin Technical Association) can be added as well according to the characteristics required.

Preferred catalysts for an anionic polymerization method, a coordination polymerization method and a living polymerization method include, for example, alkyl alkali metals such as n-$C_4H_9Li$, t-$C_4H_9Li$—$R_3Al$ and the like, aluminum compounds, transition metal compounds and the like.

Solvent

The composition (1) may include a solvent. The composition (1) may be polymerized in a solvent or in the absence of a solvent. When an oriented film, an anti-reflection film, a viewing angle compensator and the like are produced by photopolymerization, the composition (1) including a solvent is applied on a substrate, and the solvent is removed, followed by polymerizing the composition (1) by irradiating with light.

The preferred solvent includes, for example, benzene, toluene, xylene, mesitylene, hexane, heptane, octane, nonane, decane, tetrahydrofuran, γ-butyrolactone, N-methylpyrrolidone, dimethylformamide, dimethylsulfoxide, cyclohexane, methylcyclohexane, cyclopentanone, cyclohexanone, PGMEA and the like. The solvent may be used alone or in combination two or more kinds thereof.

Publicly known coaters (a doctor blade, coating equipments and the like) can be used for coating the composition on the substrate. It is not meaningful so much to restrict the use proportion of the solvent in the polymerization. It can be determined case by case considering the polymerization efficiency, the solvent cost, the energy cost and the like.

Surfactant

The composition (1) may include a surfactant. The surfactant has the effects of making it easy to coat the composition on a supporting substrate and controlling orientation of the liquid crystal phase. The preferred surfactant includes, for example, quaternary ammonium salts, alkylamine oxide, polyamine derivatives, polyoxyethylene-polyoxypropylene condensation products, polyethylene glycol and esters thereof, sodium laurylsulfate, ammonium laurylsulfate, laurylsulfuric acid amines, alkyl-substituted aromatic sulfonic acid salts, alkylphosphates, perfluoroalkylsulfonates, perfluoroalkyl carboxylates, perfluoroalkyl ethylene oxide adducts, perfluoroalkyltrimethyl ammonium salts and the like. The amount of the surfactant is varied depending on the kind of the surfactant, a composition ratio of the composition and the like, and it falls in a range of approximately 100 ppm to approximately 5% by weight, preferably approximately 0.1% to approximately 1% by weight based on the whole weight (excluding the solvent) of the composition (1).

Organosilicon Compound

The composition (1) may include an organosilicon compound in order to control mainly homeotropic orientation. The specific examples thereof include amines such as 3-aminopropyltrimethoxysilane, 3-aminopropyltriethoxysilane, 3-aminopropyldimethyl ethoxysilane, 3-aminopropyldiisopropylethoxysilane, 3-aminopropylmethyldiethoxysilane, 3-aminopropylpentamethyldisiloxane, 3-aminopropylmethylbis(trimethylsiloxy)silane, 3-aminopropyltris(trimethylsiloxy)silane, 3-aminobutyltriethoxysilane, N-(2-aminoethyl)-3-aminopropylmethyldimethoxysilane, N-(2-aminoethyl)-3-aminopropyltrimethoxysilane, N-(6-aminohexyl)-3-aminopropyltrimethoxysilane, (3-trimethoxysilylpropyl)diethylenetriamine and the like. The amount of the organosilicon compound is varied depending on the kind of the organosilicon compound, the composition ratio of the composition and the like, and it falls in a range of approximately 1% to 30% by weight, preferably approximately 3% to approximately 15% by weight based on the whole weight (excluding the solvent) of the composition (1).

Antioxidant

The composition (1) may include an antioxidant. The composition (1) has a high polymerizability, and therefore the antioxidant makes handling thereof easier. The preferred antioxidant includes, for example, hydroquinone, 2,6-di-t-butyl-p-cresol, 2,6-di-t-butylphenol, triphenyl phosphite, trialkyl phosphite and the like, and the preferred commercial products include "Irganox 245," "Irganox 1035" and the like manufactured by Ciba Specialty Chemicals K. K.

UV Absorber

The composition (1) may include a UV absorber. The composition (1) has a high polymerizability, and therefore a storage stability thereof is enhanced by the UV absorber. The preferred UV absorber includes, for example, "Tinuvin PS," "Tinuvin 213," "Tinuvin 109," "Tinuvin 328," "Tinuvin 384-2," "Tinuvin 327" and the like manufactured by Ciba Specialty Chemicals K. K.

Polymer

The polymer of the invention is obtained by polymerizing the compound (1) or the composition (1) including at least one compound (1). This polymer is referred to as the polymer (1). The polymer (1) of the invention has characteristics such as good optical anisotropy, high transparency, good chemical stability, good heat resistance, low water-absorbing property, low gas permeability, good hardness, good mechanical strength and the like. The mechanical strength described above includes a Young' modulus, a tensile strength, a tear strength, a flexural strength, a flexural modulus, an impact strength and the like. The polymer (1) has a constitutional unit derived from the compound (1).

The kind of polymerization includes radical polymerization, anionic polymerization, cationic polymerization, coordination polymerization and the like. Considering the properties of the polymerizable group, the cationic polymerization is preferred, and the cationic polymerization carried out by irradiating with light is more preferred for obtaining the polymer having excellent orientation. The preferred reaction temperature falls in a range of approximately 0° C. to approximately 150° C., and the preferred reaction time is approximately 1 to approximately 100 hours. The kind of the polymer obtained is a homopolymer, a random copolymer, an alternate copolymer, a block copolymer, a graft copolymer and the like. The polymerization method and the polymer which are suited to the applications are preferably selected.

The polymer (1) is a thermoplastic resin or a thermosetting resin. The weight average molecular weight of the thermoplastic resin falls in a range of preferably approximately 500 to approximately 1,000,000, more preferably approximately 1,000 to approximately 500,000 and particularly preferably approximately 5,000 to approximately 100,000. The weight average molecular weight can be measured, for example, using a gel permeation chromatograph (GPC). The above polymer (1) is soluble in a solvent and therefore is readily molded into a form suited to the applications. The thermoplastic resin can be obtained by using the compound (1) and other polymerizable compounds having a polymerizable group at one end with reducing a proportion of the compound (1). On the other hand, the thermosetting resin is liable to be obtained when the compound (1) is used alone or in a high proportion or when a compound having polymerizable groups at both ends is used as the other polymerizable compound. The thermosetting resin has a three-dimensional cross-linked structure. Such polymer (1) is insoluble in a solvent, and therefore the molecular weight cannot be measured. When the composition of the invention is applied on a substrate and polymerized to fix orientation of molecules to thereby obtain an optical anisotropy, it is not further processed. Accordingly, the size of the molecular weight does not matter, and the conditions in the use environment may be satisfied.

A cross-linking agent may be added in order to raise the molecular weight. Addition of the cross-linking agent infinitely increases the molecular weight of the resulting polymer to make it possible to obtain the polymer which exhibits excellent chemical resistance and heat resistance. Any compounds can be used as the cross-linking agent as long as they are publicly known to persons having an ordinary skill in the art, and it includes, for example, tris(3-mercaptopropionate) and the like.

The polymer (1) of the invention can be used in the form of a film, a fiber, a molded article and the like. The preferred form is a film. The film is obtained by a method in which the composition (1) is applied on a substrate and polymerized, a method in which a solution of the polymer (1) is applied on an oriented substrate and in which the solvent is removed and a method in which the polymer (1) is molded by pressing. The thickness of the polymer is varied depending on a value of an optical anisotropy of the polymer and the applications, and therefore a range thereof cannot strictly be determined. The thickness falls, for example, in a range of approximately 0.05 to approximately 50 μm, preferably approximately 0.1 to approximately 20 μm and more preferably approximately 0.5 to approximately 10 μm.

When an optically anisotropic thin film is formed on a substrate, any substrates can suitably be used as long as they are publicly known to persons having an ordinary skill in the art. They include, for example, glass, polyesters such as polyethylene terephthalate (PET) and the like, polyvinyl alcohol (PVA), polycarbonate (PC), triacetyl cellulose (TAC), norbornene base polymers and the like. The commercial products include, for example, "Zeonor" (registered trade name) and "Zeonex" (registered trade name) manufactured by Zeon Corporation, "Arton" (registered trade name) manufactured by JSR Corporation and the like. The polymer (1) of the invention exhibits excellent close adhesiveness to the above substrates.

Classification of orientation in the invention includes homogeneous (parallel) orientation, homeotropic (vertical) orientation, hybrid orientation, tilt orientation and twist orientation. The homogeneous orientation shows a state in which an orientation vector is parallel to a substrate and stays in one direction. The homeotropic orientation shows a state in which an orientation vector is vertical to a substrate. The hybrid orientation shows a state in which an orientation vector is varied from a form parallel to a substrate to a form vertically standing therefrom as the orientation vector is apart from the substrate. The tilt orientation shows a state in which an orientation vector stands from a substrate in a fixed tilt angle to the substrate. The above orientations are observed in compounds and compositions having a nematic phase. On the other hand, the twist orientation is observed in compositions having a chiral nematic phase, a cholesteric phase or the like. The twist orientation shows a state in which an orientation vector is parallel to a substrate but is gradually twisted as the orientation vector is apart from the substrate. This twist is produced by the action of an optically active group.

The orientation of the composition (1) on the substrate can be obtained, for example, by subjecting an oriented film coated on the substrate to rubbing treatment and applying the composition (1) thereon. The object can be achieved by using any of the oriented films which are publicly known to persons having an ordinary skill in the art as long as the films can control the orientation, and polyimide, polyamide and polyvinyl alcohol base oriented films are suited. Further, orientation can be obtained as well by rubbing the substrate itself with a rubbing cloth and the like and then applying the composition (1) directly thereon. In the homeotropic orientation, rubbing is not necessarily required in a certain case. The oriented composition is polymerized by irradiation with light and the like to provide a molded article having an optical anisotropy, and therefore it is an industrially advantageous method.

The polymer (1) is provided with an optical anisotropy when the molecular arrangement thereof is fixed. Such polymer is called a molded article having an optical anisotropy. Further, when the compound (1) is optically active, the polymer (1) has a fixed helical structure. When the compound (1) is optically inactive, the polymer (1) having a fixed helical structure can be obtained by adding an optically active compound to the composition.

The polymer (1) in which both the molecular arrangement and the helical structure are fixed is suited to applications such as a retardation film, a polarizing element, a circularly polarized light element, an elliptically polarized light element, an anti-reflection film, a selective reflection film, a color compensator, a viewing angle compensator and a liquid crystal alignment film. The polymer (1) in which molecular arrangement is fixed is suited to applications such as a retardation film, a circularly polarized light element, an elliptically polarized light element, a selective reflection film, a color compensator and a viewing angle compensator. The polymer (1) in which a helical structure is fixed is suited to an anti-reflection film, a color compensator and the like. The polymer (1) in which both molecular arrangement and a helical structure are not fixed is suited to an anti-reflection film, a liquid crystal alignment film and the like. Further, in any cases, the polymer (1) can be used as well for adhesives, synthetic polymers having a mechanical anisotropy, cosmetics, ornaments, nonlinear optical materials, information storage materials and the like.

Heat polymerization and photopolymerization are suited for fixing molecular arrangement and a helical structure. The heat polymerization is carried out preferably in the presence of a cationic polymerization initiator. The photopolymerization is carried out preferably in the presence of an optical cationic polymerization initiator. A polymer in which molecules are arranged in a polarizing direction is obtained, for example, by a polymerization method in which the composition is irradiated with a UV ray, an electron beam or the like in the presence of an optical cationic polymerization initiator. The above polymer can be used for a liquid crystal alignment film and the like without being subjected to rubbing treatment.

A retardation film is obtained by polymerizing the composition including the optically active compound (1). A retardation film is also obtained by polymerizing the composition including the optically inactive compound (1) and a suitable amount of an optically active compound. These compositions are optically active and therefore have a helical structure. When these compositions are polymerized on a substrate subjected to orienting treatment, the polymer in which molecular arrangement and a helical structure are fixed is obtained. The characteristics of a retardation film depend on a pitch in a helical structure. This helical pitch can be controlled by the kind and an addition amount of the optically active compound. The addition amount thereof is usually approximately 0.01% to approximately 50% by weight, preferably approximately 1% to approximately 30% by weight based on the whole weight (excluding the solvent) of the composition. Only one optically active compound may be used, and plural optically active compounds may be added for the purpose of canceling out a temperature dependency of the helical pitch.

The isolated polymer is dissolved in a solvent and can be processed into a film and the like, and two kinds of the polymers may be mixed and processed or the polymers may be laminated. The preferred solvent includes, for example, N-methyl-2-pyrrolidone, dimethylsulfoxide, N,N-dimethylacetamide, N,N-dimethylformamide, N,N-dimethylacetamide dimethylacetal, tetrahydrofuran, chloroform, 1,4-dioxane, bis(methoxyethyl)ether, γ-butyrolactone, tetramethylurea, trifluoroacetic acid, ethyl trifluoroacetate, hexafluoro-2-propanol, 2-methoxyethyl acetate, methyl ethyl ketone, cyclopentanone, cyclohexanone and the like. The above solvents may be used in a mixture with ordinary solvents such as acetone, benzene, toluene, heptane, methylene chloride and the like.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

EXAMPLES

The invention shall more specifically be explained below with reference to examples, but the invention shall not be restricted by these examples.

The structures of the compounds were confirmed by a nuclear magnetic resonance spectrum, an infrared absorption spectrum, a mass spectrum and the like. A unit of a phase transition temperature is ° C.; C shows crystal; N shows a nematic phase; and I shows an isotropic liquid phase. The measuring methods of the physical property values shall be shown below.

Helical Pitch: A composition was prepared by dissolving 1 part by weight of a sample compound in 99 parts by weight of the following composition (M-1), and the helical pitch was measured at 25° C. according to a wedge method of Cano, *Applied Physics*, 43, 125 (1974).

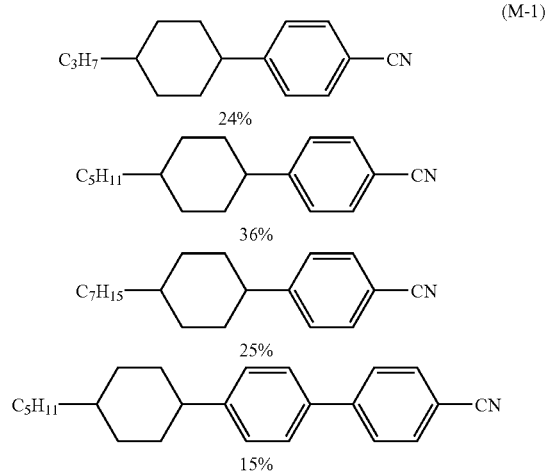

Orientation of Liquid Crystal Molecules: Orientation of a Polymer Film (Liquid crystal alignment film) formed on a glass substrate having thereon a polyimide alignment film subjected to rubbing treatment was visually determined based on an angle dependency of a transmitted light intensity by a method shown below.

The polymer film was interposed between two polarizing plates disposed in a cross nicol state, and it was irradiated with light from a direction vertical to a film surface (tilt angle: 0 degree). A change in a transmitted light was observed as increasing a tilt angle of the irradiated light from 0 degree to, for example, 50 degree. A direction of tilting the irradiated light was consistent with a direction of rubbing (long chain direction of the liquid crystal molecules).

When the transmitted light from a vertical direction was maximized, the orientation was judged to be homogeneous. In the homogeneous orientation, an orientation vector of the liquid crystal molecules is parallel to the glass substrate, and therefore it functions as an A-plate. On the other hand, in the case where the transmitted light from the vertical direction was minimized and where the transmitted light was increased as the tilt angle was increased, the orientation was judged to be homeotropic. In the homeotropic orientation, an orientation vector of the liquid crystal molecules is vertical to the glass substrate, and therefore it functions as a C-plate.

Pencil Hardness: Measured according to a method of JIS Standard "JIS-K-5400 8.4 pencil scratching test."

Other Characteristics: The characteristics such as the mechanical strength and the like were measured based on JIS Standards and the like.

Example 1

A compound (a-1) shown below was synthesized in the following manner.

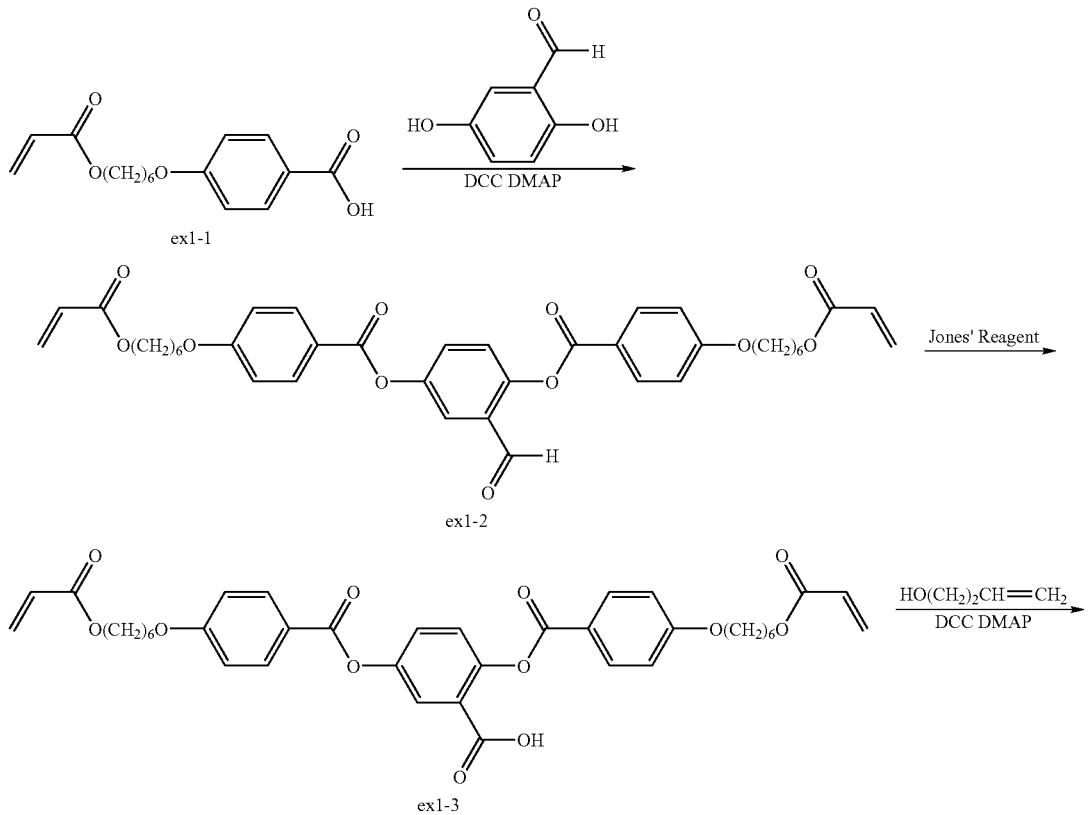

-continued

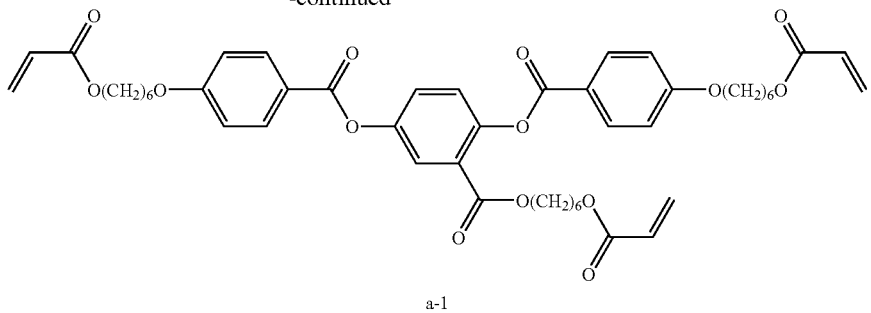

a-1

First Step: A compound (ex1-1) 81 mmol shown above, 2,5-dihydroxybenzaldehyde 37 mmol and 4-dimethylaminopyridine (DMAP) 22 mmol were added to 200 mL of dichloromethane and stirred under nitrogen atmosphere. A dichloromethane 100 mL solution of 1,3-dichlorohexylcarbodiimide (DCC) 81 mmol was dropwise added thereto. After the dropwise addition, the solution was stirred at room temperature for 10 hours. A deposit precipitated was removed by filtering, and the organic layer was washed with water and dried on hydrous magnesium sulfate. The solvent was removed by distillation under reduced pressure, and the residue was refined by column chromatography and recrystallized from ethanol, whereby a compound (ex 1-2) 27 mmol shown above was obtained.

Second Step: The compound (ex1-2) 26 mmol and a Jones reagent 51 mmol were added to 200 mL of acetone and stirred on an ice bath for 15 hours. Water was added thereto, and the mixture was extracted with ethyl acetate. The organic layer was washed with water and dried on hydrous magnesium sulfate. The solvent was removed by distillation under reduced pressure, and the residue was refined by column chromatography and recrystallized from heptane, whereby a compound (ex 1-3) 20 mmol shown above was obtained.

Third Step: The compound (ex1-3) 3.4 mmol, 2-hydroxyethyl acrylate 4.3 mmol and DMAP 1.1 mmol were added to 30 mL of dichloromethane and stirred under nitrogen atmosphere. A dichloromethane 10 mL solution of DCC 3.9 mmol was dropwise added thereto. After the dropwise addition, the solution was stirred at room temperature for 10 hours. A deposit precipitated was removed by filtering, and the organic layer was washed with water and dried on hydrous magnesium sulfate. The solvent was removed by distillation under reduced pressure, and the residue was refined by column chromatography and recrystallized from ethanol, whereby a compound (a-1) 1.6 mmol shown above was obtained.

A phase transition temperature (monotropic phase transition was shown in a parenthesis), an NMR measuring data and a melting point of the compound (a-1) thus obtained are shown below.

Phase transition temperature: C 46.8 (N 38.2) I.

$^1$H-NMR (CDCl$_3$): 1.44 to 1.58 (m, 8H), 1.70 to 1.77 (m, 4H), 1.82 to 1.88 (m, 4H), 4.05 (t, 2H), 4.06 (t, 2H), 4.19 (t, 4H), 4.22 to 4.24 (m, 2H), 4.40 to 4.43 (m, 2H), 5.79 to 5.85 (m, 3H), 6.02 to 6.16 (m, 3H), 6.36 to 6.43 (m, 3H), 6.96 (d, 2H), 6.99 (d, 2H), 7.28 (d, 1H), 7.48 (d, d, 1H), 7.91 (d, 1H), 8.15 (d, 4H).

Example 2

A compound (a-2) shown below was obtained using 4-hydroxybutyl acrylate in place of 2-hydroxyethyl acrylate at the third step in Example 1.

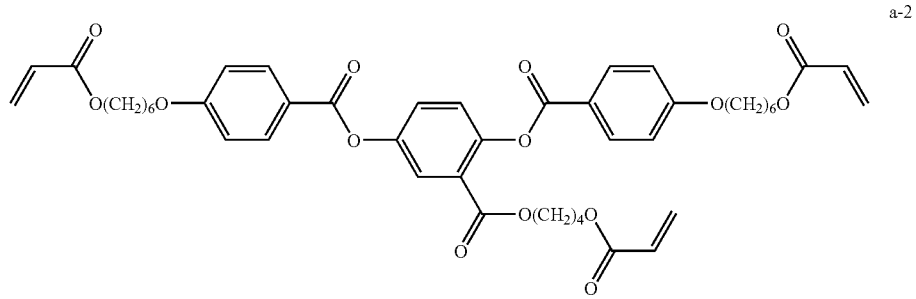

a-2

A phase transition temperature (monotropic phase transition was shown in a parenthesis), an NMR measuring data and a melting point of the compound (a-2) thus obtained are shown below.

Phase transition temperature: C 53.3 (N 50.3) I.

$^1$H-NMR (CDCl$_3$): 1.44 to 1.69 (m, 12H), 1.70 to 1.77 (m, 4H), 1.81 to 1.89 (m, 4H), 4.01 to 4.08 (m, 6H), 4.17 to 4.22 (m, 6H), 5.79 to 5.85 (m, 3H), 6.05 to 6.16 (m, 3H), 6.35 to 6.44 (m, 3H), 6.98 (d, 4H), 7.28 (d, 1H), 7.47 (d, d, 1H), 7.89 (d, 1H), 8.15 (d, 2H), 8.17 (d, 2H).

Example 3

A compound (d-6) shown below was synthesized in the following manner.

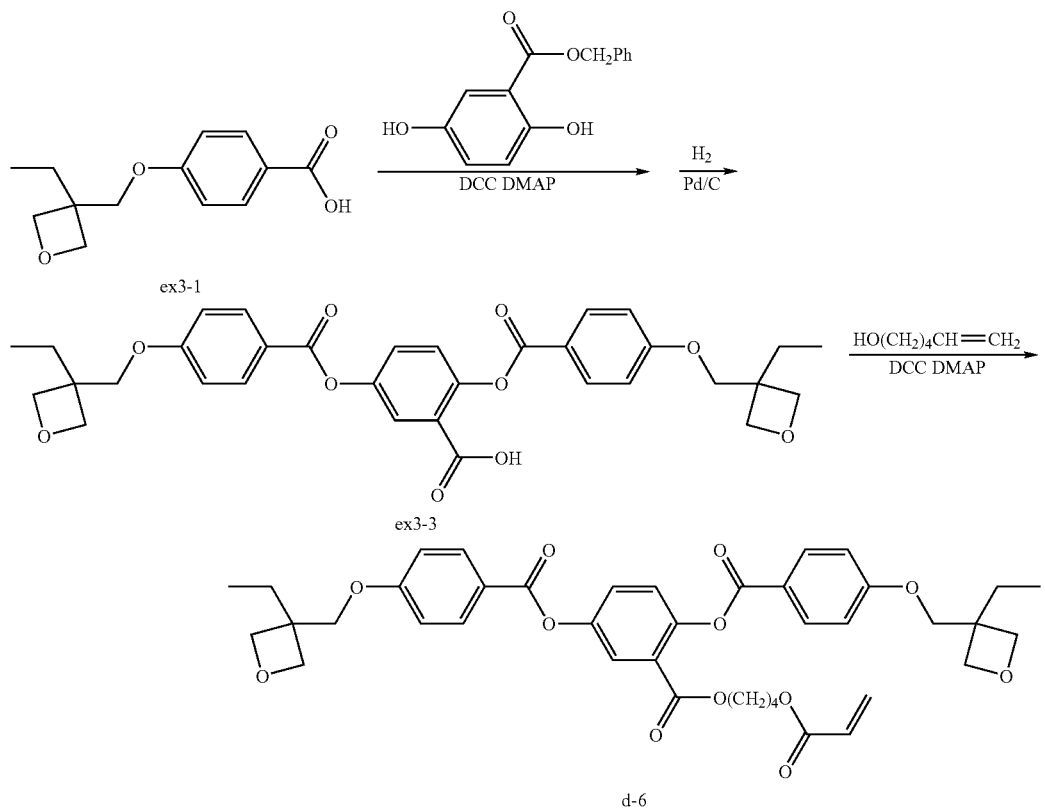

First Step: A compound (ex3-1) 45 mmol shown above, benzyl 2,5-dihydroxybenzoate 21 mmol and DMAP 12 mmol were added to 100 mL of dichloromethane and stirred under nitrogen atmosphere. A dichloromethane 30 mL solution of DCC 45 mmol was dropwise added thereto. After the dropwise addition, the solution was stirred at room temperature for 10 hours. A deposit precipitated was removed by filtering, and the organic layer was washed with water and dried on hydrous magnesium sulfate. The solvent was removed by distillation under reduced pressure, and the residue was refined by column chromatography. The compound thus obtained and Pd/C (2 g) were added to ethylacetate and stirred at room temperature for 5 hours under hydrogen atmosphere. A compound (ex3-2) 17 mmol was obtained by removing Pd/C and then recrystallizing from heptane.

Second Step: The compound (ex3-2) 4.2 mmol, 4-hydroxybutyl acrylate 4.7 mmol and DMAP 1.3 mmol were added to 30 mL of dichloromethane and stirred under nitrogen atmosphere. A dichloromethane 10 mL solution of DCC 4.7 mmol was dropwise added thereto. After the dropwise addition, the solution was stirred at room temperature for 10 hours. A deposit precipitated was removed by filtering, and the organic layer was washed with water and dried on hydrous magnesium sulfate. The solvent was removed by distillation under reduced pressure, and the residue was refined by column chromatography to obtain an oily compound (d-6) 3.6 mmol shown above.

An NMR measuring data of the compound (d-6) thus obtained is as follows: $^1$H-NMR (CDCl$_3$): 0.97 (t, 6H), 1.67 to 1.69 (m, 4H), 1.92 (q, 4H), 4.02 (t, 2H), 4.19 (s, 4H), 4.21 (t, 2H), 4.52 (d, 4H), 4.60 (d, 4H), 5.80 (d, d, 1H), 6.08 (d, d, 1H), 6.37 (d, d, 1H), 7.05 (d, 4H), 7.28 (d, 1H), 7.48 (d, d, 1H), 7.90 (d, 1H), 8.18 (d, 2H), 8.19 (d, 2H).

Example 4

The following compound (c-1) was obtained using 3-ethyl-3-oxetanemethanol in place of 4-hydroxybutyl acrylate at the second step in Example 3.

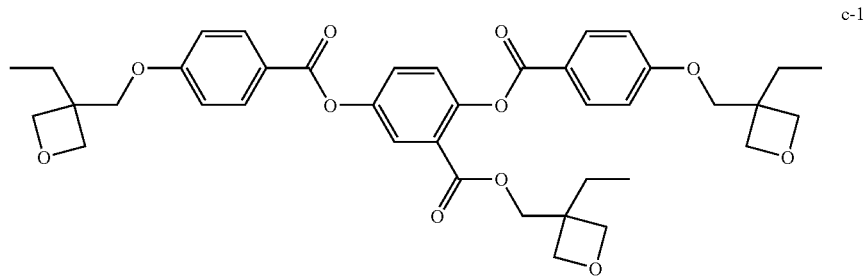

A phase transition temperature, an NMR measuring data and a melting point of the compound (c-1) thus obtained are shown below.

Phase transition temperature: C 137.8 I.

$^1$H-NMR (CDCl$_3$): 0.83 (t, 3H), 0.96 (t, 6H), 1.68 (q, 2H), 1.91 (q, 4H), 4.18 (s, 2H), 4.19 (s, 2H), 4.26 (d, 2H), 4.37 (d, 2H), 4.39 (s, 2H), 4.52 (d, 4H), 4.60 (d, 4H), 7.05 (d, 4H), 7.28 (d, 1H), 7.48 (d, d, 1H), 7.88 (d, 1H), 8.18 (d, 4H).

Example 5

A photopolymerization initiator "Irgacure 907" (manufactured by Ciba Specialty Chemicals K. K.) 3 parts by weight was added to a composition including 60 parts by weight of the compound (a-1) produced in Example 1, 20 parts by weight of 2,7-bis(4-(6-acryloyloxyhexyloxy)-benzoyloxy)-9-methylfluorene and 20 parts by weight of 4'-(6-acryloyloxyhexyloxy)-4-cyanobiphenyl. The polymerizable composition 100 parts by weight including the photopolymerization initiator was dissolved in cyclopentanone 300 parts by weight to prepare a solution having a concentration of 25% by weight. This solution was applied on a glass substrate having a polyimide alignment film which was subjected to rubbing treatment. The thickness of the solution was controlled to about 12 μm by a bar coater. This glass substrate was put on a hot plate heated at 70° C. for 120 seconds to vaporize the solvent. The molecular orientation was considered to be fixed by the above operation.

Next, the film was polymerized by irradiating with light having an intensity of 30 mW/cm$^2$ (central wavelength: 365 nm) at room temperature for 30 seconds under the atmosphere by means of a ultrahigh pressure mercury lamp of 250 W. Homogeneous orientation in the thin film thus obtained was fixed, and it showed an A plate optical characteristic. The thin film obtained had a pencil hardness of H.

Example 6

The same procedure as in Example 5 was carried out to obtain a thin film having homogeneous orientation, except that the polymerizable liquid crystal composition prepared in Example 5 was replaced by a composition including 25 parts by weight of the compound (a-2) produced in Example 2, 50 parts by weight of 1,4-bis(4-(6-acryloyloxybutyloxycarboxy)benzoyloxy)-2-methylbenzene and 25 parts by weight of 4-(trans-4-propylcyclohexyl)acryloyloxybenzene. The thin film obtained had a pencil hardness of H.

Example 7

The same procedure as in Example 5 was carried out to obtain a thin film having homogeneous orientation, except that the polymerizable liquid crystal composition prepared in Example 5 was replaced by a composition including 60 parts by weight of the compound (a-2) produced in Example 2, 20 parts by weight of 1,4-bis(2-(4-(6-acryloyloxy hexyloxy) ethyl)benzoyloxy)-2,3-bistrifluoromethylbenzene and 20 parts by weight of 4'-(6-acryloyloxyhexyloxy)-4-cyanobiphenyl. The thin film obtained had a pencil hardness of 2H.

Comparative Example

The same procedure as in Example 5 was carried out to obtain a thin film having homogeneous orientation, except that the compound (a-1) used in Example 5 was replaced by 1,4-bis(4-(6-acryloyloxyhexyloxy)benzoyloxy)-2-methylbenzene. The thin film obtained had a pencil hardness of HB.

Composition Example

The suitable examples of compositions which can be prepared using the compound (1) of the invention are shown below as Composition Example 1 to Composition Example 7. All of them were polymerized by irradiation with a UV ray to provide polymers having an optical anisotropy. Percentage (%) in the following compositions shows % by weigh.

Composition Example 1

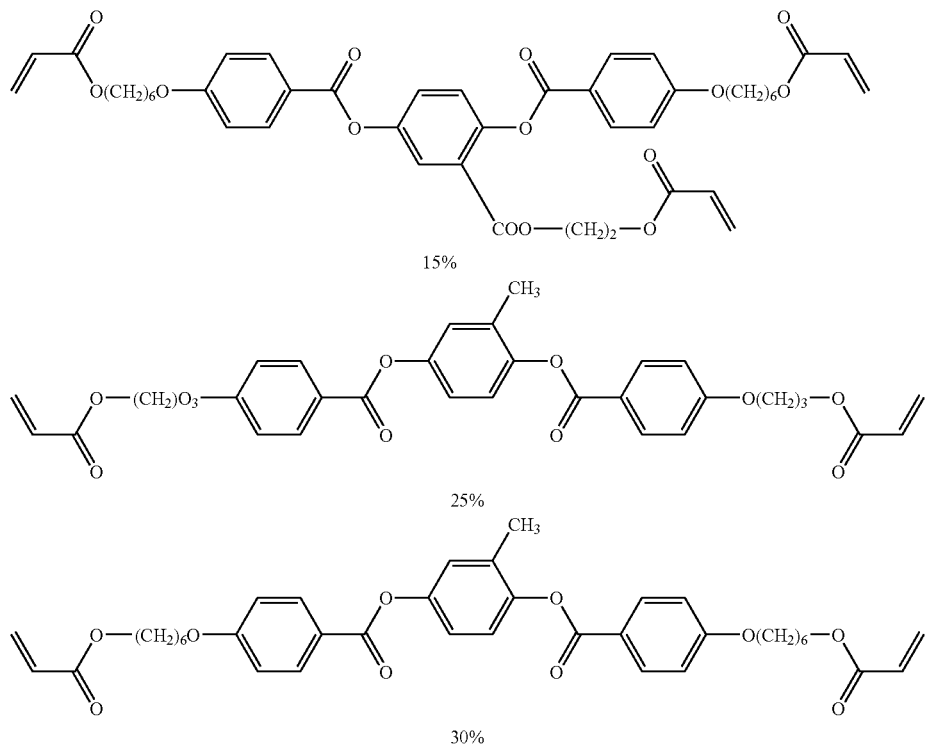

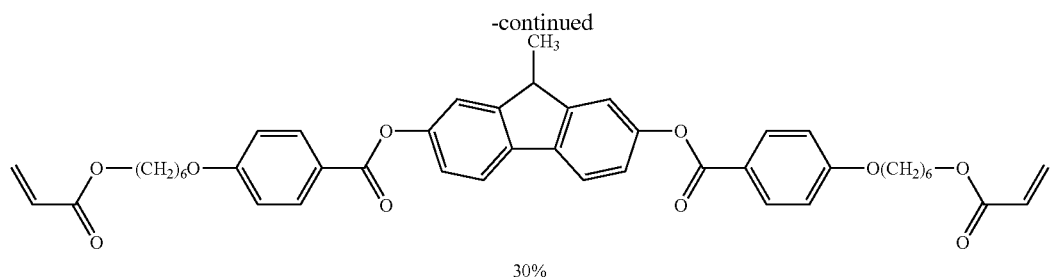
30%
Composition Example 2
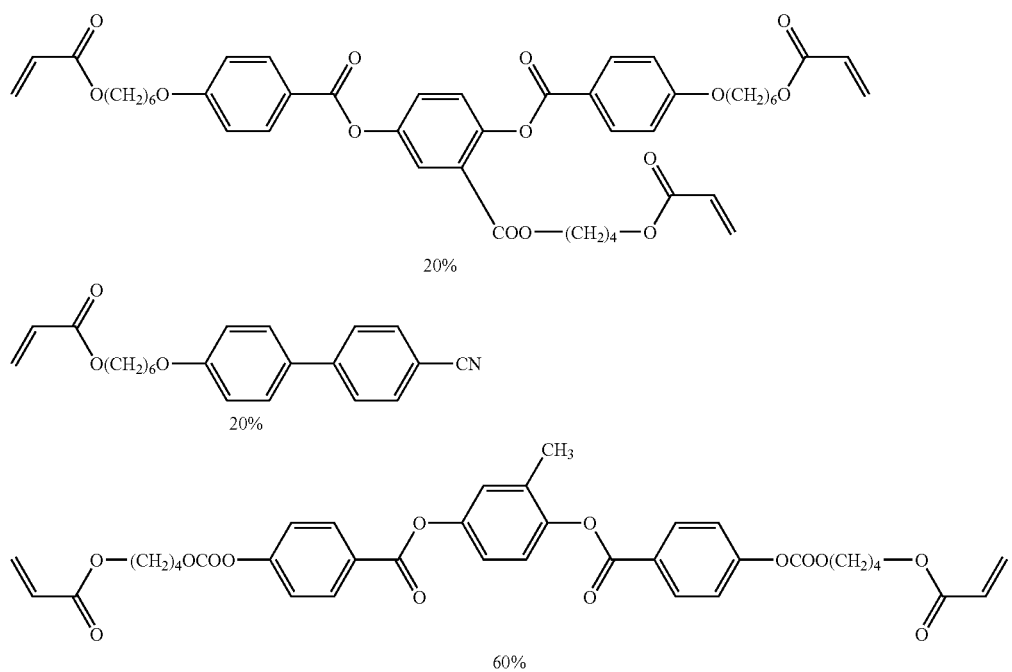
Composition Example 3
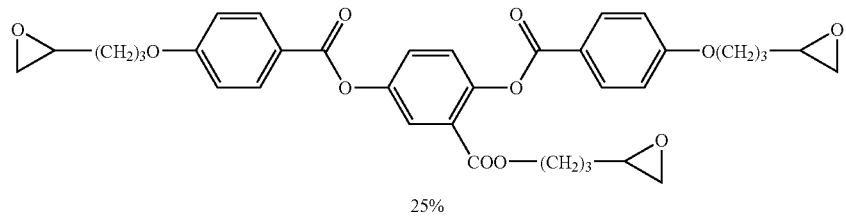
25%
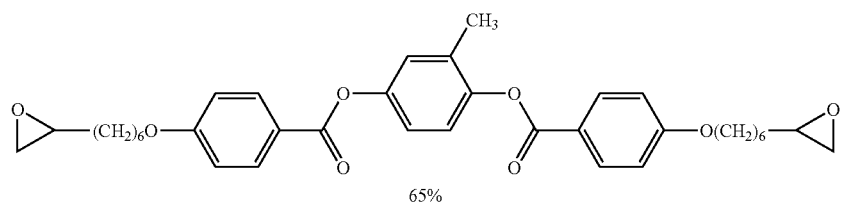
65%

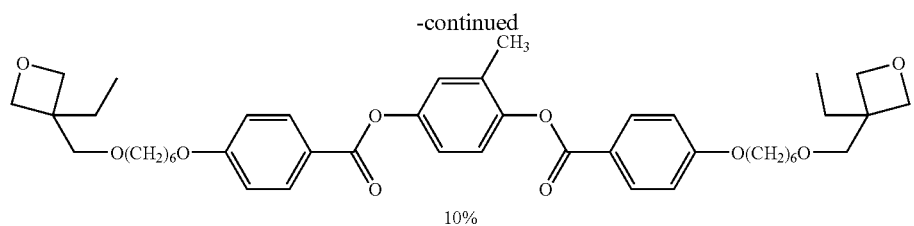
10%
Composition Example 4
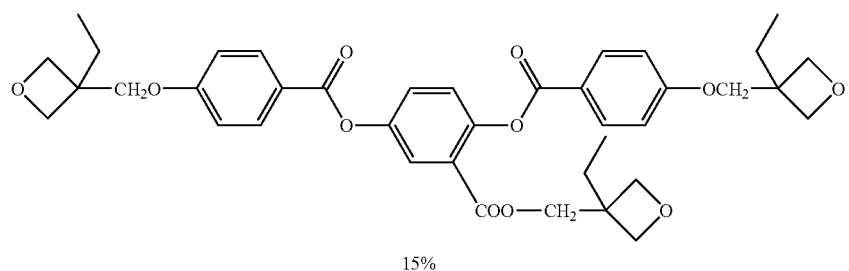
15%
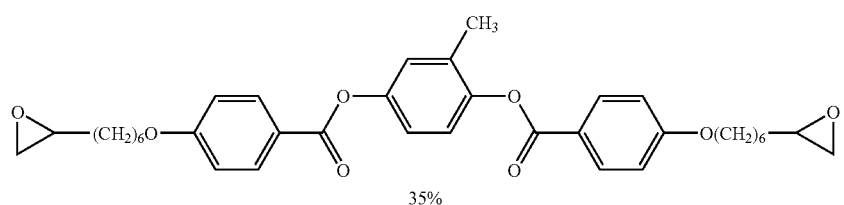
35%
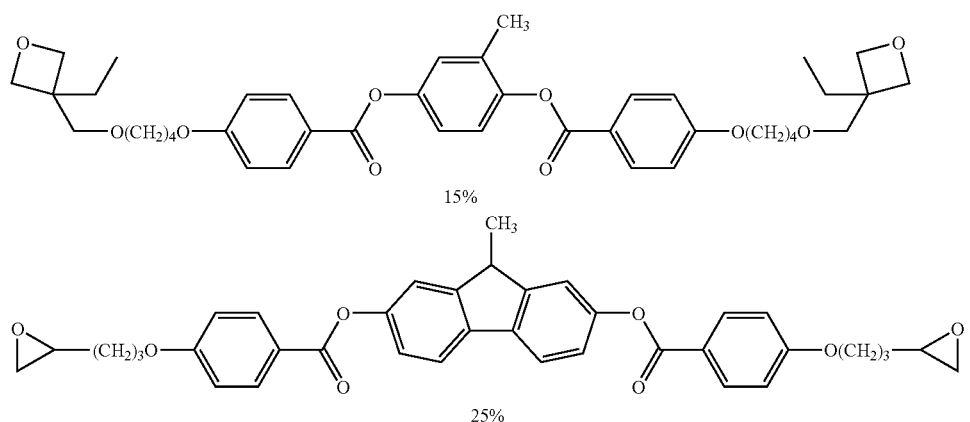
15%
25%
Composition Example 5
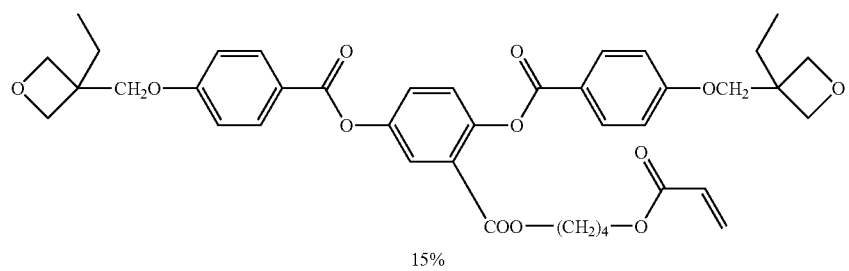
15%

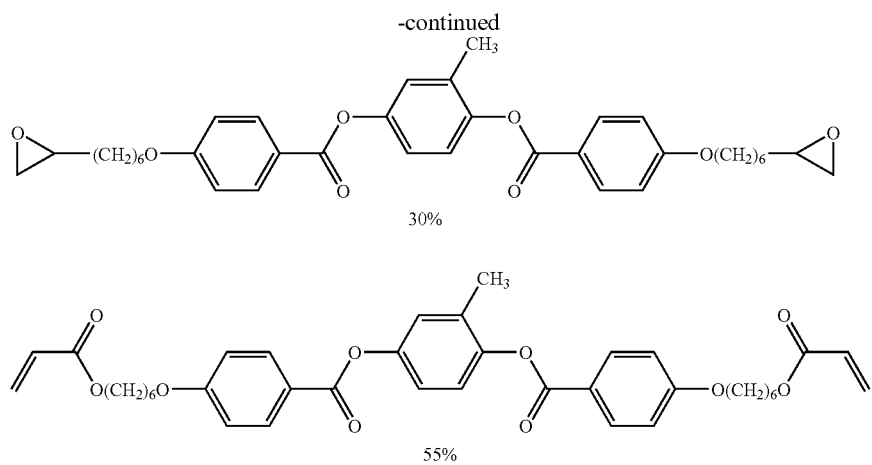
Composition Example 6
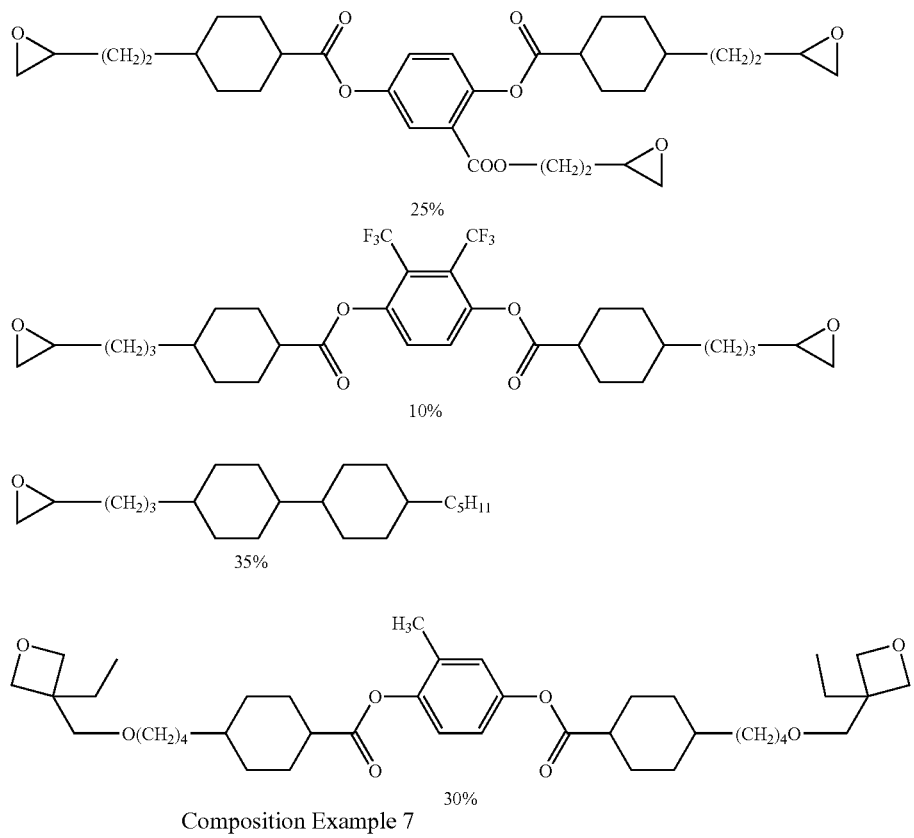
Composition Example 7
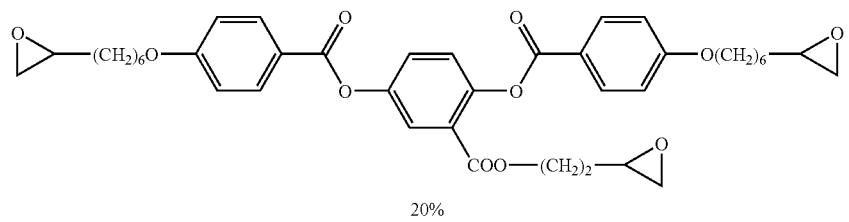

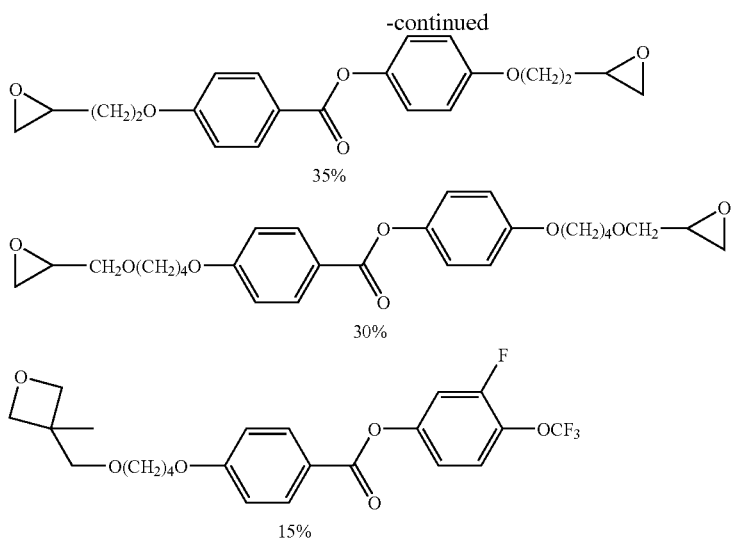

INDUSTRIAL APPLICABILITY

The composition of the invention has applicability as a liquid crystal composition for a liquid crystal display. Further, the polymer of the invention has applicability to, for example, a retardation film, a polarizing element, a circularly polarized light element, an elliptically polarized light element, an anti-reflection film, a selective reflection film, a color compensator, a viewing angle compensator, a liquid crystal alignment film, an adhesive and the like.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A compound represented by Formula (1):

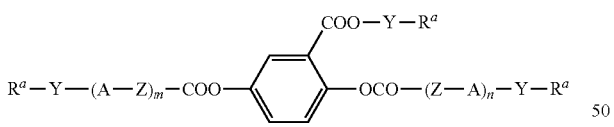
(1)

wherein in Formula (1), $R^a$ is independently any of the groups represented by Formulas (2-1) to (2-6);

(2-1)

(2-2)

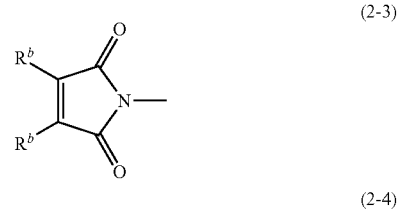
(2-3)

(2-4)

(2-5)

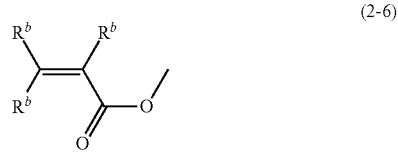
(2-6)

A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —$CH_2$— may be replaced by —O—, optional —CH═ may be replaced by —N═ and optional hydrogens may be replaced by halogen, alkyl having 1 to 5 carbon atoms or halogenated alkyl having 1 to 5 carbon atoms; Z is independently a single bond or alkylene having 1 to 20 carbon atoms; in the alkylene, optional —$CH_2$— may be replaced by —O—, —CO—, —COO—, —OCO—, —CH═H—, —CF═CF— or —C≡C— and optional hydrogen may be replaced by halogen; Y is independently a single bond or alkylene having 1 to 20 carbon atoms; in the alkylene, optional —$CH_2$— may be replaced by —O—, —CO—, —COO—, —OCO—, —OCOO— or —CH═CH— and optional hydrogen may be replaced by halogen; m and n are independently an integer of 0 to 5; when all $R^a$ are methacryloyloxy groups, excluded is a case in which m=n=1, two A are 1,4-phenylene, two Z are single bonds, two Y adjacent to A are —(OCH$_2$)$_4$— or —(OCH$_2$CH$_2$)$_{1-10}$— and remaining Y is —CH$_2$CH$_2$—; and wherein in Formulas (2-1) to (2-6), R$^b$ is independently hydrogen, halogen or alkyl having 1 to 5 carbon atoms, and optional hydrogen in the alkyl may be replaced by halogen.

2. The compound of claim 1, wherein in Formula (1), m+n is an integer of 1, 2 or 3.

3. The compound of claim 1, wherein in Formula (1), m+n is 2.

4. The compound of claim 1, wherein in Formula (1), R$^a$ is independently a group represented by Formula (2-4), (2-5) or (2-6).

5. The compound of claim 1, wherein in Formula (1), A is independently 1,4-cyclohexylene, 1,4-phenylene, pyridine-2,5-diyl, pyridazine-3,6-diyl or pyrimidine-2,5-diyl, and optional hydrogens in these rings may be replaced by Cl, F, alkyl having 1 to 3 carbon atoms or fluoroalkyl having 1 to 3 carbon atoms.

6. The compound of claim 1, wherein in Formula (1), Z is independently a single bond, —CH$_2$O—, —OCH$_2$—, —COO—, —OCO—, —CH=CH—, —(CH$_2$)$_2$COO—, —OCO(CH$_2$)$_2$—, —CH=CH—COO—, —OCO—CH=CH— or —C≡C—.

7. The compound of claim 1, wherein in Formula (1), Y is independently alkylene having 1 to 10 carbon atoms, and optional —CH$_2$— in the alkylene may be replaced by —O—, —COO—, —OCO— or —OCOO—.

8. A compound represented by Formula (I) or (II):

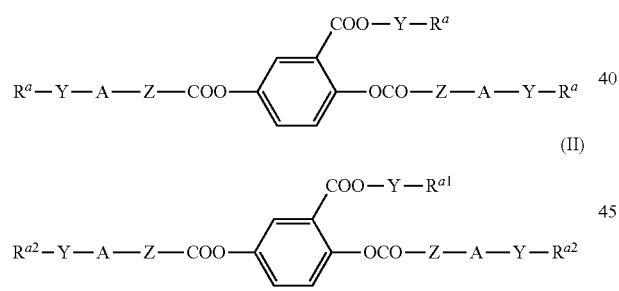

wherein in Formulas (I) and (II),

R$^a$, R$^{a1}$ and R$^{a2}$ are independently any of the groups represented by Formulas (2-1) to (2-6), and R$^{a1}$ is not the same as R$^{a2}$;

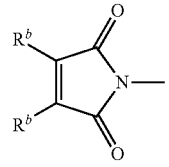

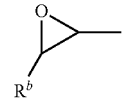

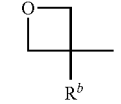

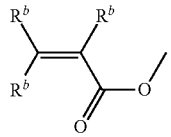

A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —CH$_2$— may be replaced by —O—, optional —CH= may be replaced by —N= and optional hydrogens may be replaced by halogen, alkyl having 1 to 5 carbon atoms or halogenated alkyl having 1 to 5 carbon atoms; Z is independently a single bond or alkylene having 1 to 20 carbon atoms; in the alkylene, optional —CH$_2$— may be replaced by —O—, —CO—, —COO—, —OCO—, —CH=CH—, —CF=CF— or —C≡C— and optional hydrogen may be replaced by halogen; Y is independently a single bond or alkylene having 1 to 20 carbon atoms; in the alkylene, optional —CH$_2$— may be replaced by —O—, —CO—, —COO—, —OCO— or —CH=CH—; and optional hydrogen may be replaced by halogen; provided that when all R$^a$ in Formula (I) are methacryloyloxy groups, excluded is the case in which two A are 1,4-phenylene, two Z are single bonds, two Y adjacent to A are —(OCH$_2$)$_4$— or —(OCH$_2$CH$_2$)$_{1-10}$— and remaining Y is —CH$_2$CH$_2$—; and wherein in Formulas (2-1) to (2-6), R$^b$ is independently hydrogen, halogen or alkyl having 1 to 5 carbon atoms, and optional hydrogen in the alkyl may be replaced by halogen.

9. The compound of claim 8, wherein in Formulas (I) and (II), R$^a$, R$^{a1}$ and R$^{a2}$ are each independently a group represented by Formula (2-4), (2-5) or (2-6).

10. The compound of claim 8, wherein in Formulas (I) and (II), A is independently 1,4-cyclohexylene, 1,4-phenylene, pyridine-2,5-diyl, pyridazine-3,6-diyl or pyrimidine-2,5-diyl, and optional hydrogens in these rings may be replaced by Cl, F, alkyl having 1 to 3 carbon atoms or fluoroalkyl having 1 to 3 carbon atoms.

11. The compound of claim 8, wherein in Formulas (I) and (II), Z is independently a single bond, —CH$_2$O—, —OCH$_2$—, —COO—, —OCO—, —CH=CH—, —(CH$_2$)$_2$COO—, —OCO(CH$_2$)$_2$—, —CH=CH—COO—, —OCO—CH=CH— or —C≡C—.

12. The compound of claim 8, wherein in Formulas (I) and (II), Y is independently a single bond or alkylene having 1 to 10 carbon atoms, and optional —CH$_2$— in the alkylene may be replaced by —O—, —COO—, —OCO— or —OCOO—.

13. The compound of claim 8, wherein in Formulas (I) and (II), A is independently 1,4-cyclo hexylene or 1,4-phenylene, and optional hydrogens in these rings may be replaced by Cl, F, CH$_3$ or CF$_3$.

14. The compound of claim 8, wherein in Formulas (I) and (II), Z is independently a single bond, —COO— or —OCO—.

15. The compound of claim 8, wherein in Formulas (I) and (II), Y is independently alkylene having 1 to 10 carbon atoms, and —CH$_2$— adjacent to the ring in the alkylene may be replaced by —O—, —COO—, —OCO— or —OCOO—.

16. A composition comprising at least one compound as described in claim 1.

17. A composition comprising at least one compound as described in claim 8.

18. A composition comprising at least one compound of claim 1 and at least one compound selected from the group of compounds represented by Formulas (M1), (M2), (M3) and (M4):

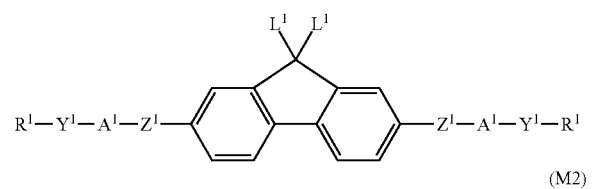

(M1)

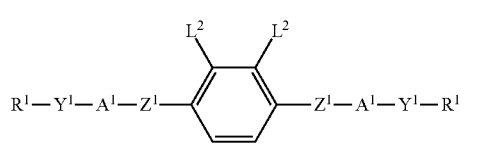

(M2)

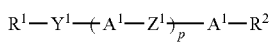

(M3)

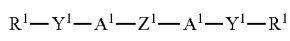

(M4)

wherein in Formulas (M1), (M2), (M3) and (M4), R$^1$ is independently a group represented by Formula (2-4), (2-5) or (2-6);

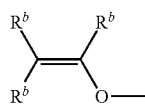

(2-1)

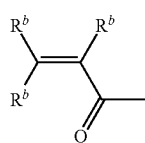

(2-2)

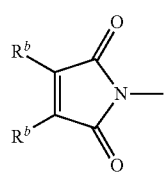

(2-3)

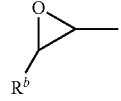

(2-4)

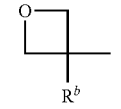

(2-5)

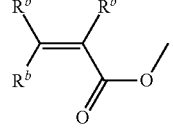

(2-6)

R$^2$ is alkyl having 1 to 10 carbon atoms, alkoxy having 1 to 10 carbon atoms, Cl, F, CN, CF$_3$ or OCF$_3$; A$^1$ is independently 1,4-cyclohexylene or 1,4-phenylene, and optional hydrogen in the 1,4-phenylene may be replaced by F; Z$^1$ is independently a single bond, —CH$_2$CH$_2$—, —CH$_2$O—, —OCH$_2$—, —COO—, —OCO—, —CH=CH—, —C≡C—, —CH=CH—COO—, —CH=CH—OCO—, —(CH$_2$)$_2$COO— or —(CH$_2$)$_2$OCO—;

Y$^1$ is independently a single bond or alkylene having 1 to 20 carbon atoms, and in the alkylene, optional —CH$_2$— may be replaced by —O—, —CO—, —COO—, —OCO—, —OCOO— or —CH=CH—; L$^1$ is independently H, F or CH$_3$; L$^2$ is independently H, Cl, F, CH$_3$ or CF$_3$; and p is an integer of 1 or 2.

19. The composition of claim 18, wherein in Formula (1), R$^a$ is independently a group represented by Formula (2-4), (2-5) or (2-6); A is independently 1,4-cyclohexylene, 1,4-phenylene, pyridine-2,5-diyl, pyridazine-3,6-diyl or pyrimidine-2,5-diyl, and optional hydrogens in these rings may be replaced by Cl, F, alkyl having 1 to 3 carbon atoms or fluoroalkyl having 1 to 3 carbon atoms; Z is independently a single bond, —CH$_2$O—, —OCH$_2$—, —COO—, —OCO—, —CH=CH—, —(CH$_2$)$_2$COO—, —OCO(CH$_2$)$_2$—, —CH=CH—COO—, —OCO—CH=CH— or —C≡C—; Y is independently a single bond or alkylene having 1 to 10 carbon atoms, and optional —CH$_2$— in the alkylene may be replaced by —O—, —COO—, —OCO— or —OCOO—; m=n=1; in Formulas (M1), (M2), (M3) and (M4), R$^1$ is independently a group represented by Formula (2-4), (2-5) or (2-6); R$^2$ is alkyl having 1 to 5 carbon atoms, alkoxy having 1 to 5 carbon atoms, Cl, F, CN, CF$_3$ or OCF$_3$; A$^1$ is independently 1,4-cyclohexylene, 1,4-phenylene, monofluoro-1,4-phenylene or difluoro-1,4-phenylene; Z$^1$ is independently a single bond, —CH$_2$O—, —OCH$_2$—, —COO—, —OCO—, —C≡C—, —CH=CHCOO—, —CH=CHOCO—, —(CH$_2$)$_2$COO— or —(CH$_2$)$_2$OCO—; Y$^1$ is independently a single bond or alkylene having 1 to 10 carbon atoms, and in the alkylene, optional —CH$_2$— may be replaced by —O—, —COO—, —OCO— or —OCOO—; L$^1$ is independently H, F or CH$_3$; L$^2$ is independently H, Cl, F, CH$_3$ or CF$_3$; p is an integer of 1 or 2; the proportion of the compound represented by Formula (1) is approximately 5% to approximately 80% by weight, and the proportion of the compounds represented by Formulas (M1), (M2), (M3) and (M4) is approximately 20% to approximately 95% by weight each based on the total amount of the compound represented by Formula (1) and the compounds represented by Formulas (M1), (M2), (M3) and (M4).

20. The composition of claim 18, wherein in Formula (1), $R^a$ is independently a group represented by Formula (2-4), (2-5) or (2-6); A is independently 1,4-cyclohexylene or 1,4-phenylene, and optional hydrogens in these rings may be replaced by Cl, F, $CH_3$ or $CF_3$; Z is independently a single bond, —COO— or —OCO—; Y is independently alkylene having 1 to 10 carbon atoms, and in the alkylene, —$CH_2$— adjacent to the ring may be replaced by —O—, —COO—, —OCO— or —OCOO—; m=n=1; in Formulas (M1), (M2), (M3) and (M4), $R^1$ is independently a group represented by Formula (2-4), (2-5) or (2-6); $R^2$ is alkyl having 1 to 5 carbon atoms, alkoxy having 1 to 5 carbon atoms, CN, F or $OCF_3$; $A^1$ is independently 1,4-cyclohexylene, 1,4-phenylene, monofluoro-1,4-phenylene or difluoro-1,4-phenylene; $Z^1$ is independently a single bond, —COO—, —OCO—, —CH=CHCOO—, —CH=CHOCO—, —$(CH_2)_2$COO— or —$(CH_2)_2$OCO—; $Y^1$ is independently a single bond or alkylene having 1 to 10 carbon atoms, and in the alkylene, —$CH_2$— adjacent to the ring may be replaced by —O—, —COO—, —OCO— or —OCOO—; $L^1$ is independently H or $CH_3$; $L^2$ is independently H, F, $CH_3$ or $CF_3$; p is 2; the proportion of the compound represented by Formula (1) is approximately 5% to approximately 60% by weight, and the proportion of the compounds represented by Formulas (M1), (M2), (M3) and (M4) is approximately 40% to approximately 95% by weight each based on the total amount of the compound represented by Formula (1) and the compounds represented by Formulas (M1), (M2), (M3) and (M4).

21. The composition of claim 16, further comprising at least one additional polymerizable compound.

22. The composition of claim 17, further comprising at least one additional polymerizable compound.

23. The composition of claim 21, wherein the at least one additional polymerizable compound is actively active.

24. The composition of claim 22, wherein the at least one additional polymerizable compound is actively active.

25. The composition of claim 16, further comprising at least one non-polymerizable liquid crystalline compound.

26. The composition of claim 17, further comprising at least one non-polymerizable liquid crystalline compound.

27. The composition of claim 16, further comprising at least one non-polymerizable optically active compound.

28. The composition of claim 17, further comprising at least one non-polymerizable optically active compound.

29. A polymer comprising a constitutional unit derived from a compound of claim 1.

30. A polymer comprising a constitutional unit derived from a compound of claim 8.

31. A polymer obtained by polymerizing the composition of claim 16.

32. A polymer obtained by polymerizing the composition of claim 17.

33. The polymer of claim 30, wherein said polymer is optically active.

34. The polymer of claim 31, wherein said polymer is optically active.

35. A film comprising the polymer of claims 29.

36. A film comprising the polymer of claims 30.

37. A molded article having an optical anisotropy, comprising the polymer of claim 29.

38. A molded article having an optical anisotropy, comprising the polymer of claim 30.

39. A liquid crystal display element comprising the film of claim 35.

40. A liquid crystal display element comprising the film of claim 36.

41. A liquid crystal display element comprising the molded article having an optical anisotropy of claim 37.

42. A liquid crystal display element comprising the molded article having an optical anisotropy of claim 38.

43. A liquid crystal display element comprising the composition of claim 16.

44. A liquid crystal display element comprising the composition of claim 17.

* * * * *